(12) United States Patent
Smith et al.

(10) Patent No.: US 12,172,298 B2
(45) Date of Patent: Dec. 24, 2024

(54) ROBOTIC END-EFFECTOR HAVING DYNAMIC STIFFENING ELEMENTS WITH RESILIENT SPACERS FOR CONFORMING OBJECT INTERACTION

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 0 days.

(21) Appl. No.: 18/503,034

(22) Filed: Nov. 6, 2023

(65) Prior Publication Data

US 2024/0157576 A1    May 16, 2024

Related U.S. Application Data

(60) Provisional application No. 63/422,870, filed on Nov. 4, 2022.

(51) Int. Cl.
| | |
|---|---|
| *B25J 15/00* | (2006.01) |
| *B25J 9/16* | (2006.01) |
| *B25J 15/10* | (2006.01) |

(52) U.S. Cl.
CPC .......... *B25J 15/0023* (2013.01); *B25J 15/10* (2013.01); *B25J 9/1612* (2013.01); *B25J 15/0009* (2013.01)

(58) Field of Classification Search
CPC .... B25J 15/0023; B25J 15/0009; B25J 15/08; B25J 15/10; B25J 9/1612; B25J 15/0028
USPC .................................................. 294/99.1, 196
See application file for complete search history.

(56) References Cited

U.S. PATENT DOCUMENTS

| | | | |
|---|---|---|---|
| 1,880,138 | A | 9/1932 | Franz |
| 2,850,189 | A | 9/1958 | Leroy |
| 2,981,198 | A | 4/1961 | Nettel |
| 3,171,549 | A | 3/1965 | Orloff |
| 3,280,991 | A | 10/1966 | Melton et al. |
| 3,306,646 | A | 2/1967 | Flora, Jr. |

(Continued)

FOREIGN PATENT DOCUMENTS

| | | |
|---|---|---|
| CN | 101214653 A | 7/2008 |
| CN | 101823517 A | 9/2010 |

(Continued)

OTHER PUBLICATIONS

International Search Report for International Application No. PCT/US2023/072422 dated Dec. 18, 2023, 12 pages.

(Continued)

*Primary Examiner* — Paul T Chin
(74) *Attorney, Agent, or Firm* — Christopher L. Johnson

(57) ABSTRACT

A robotic end-effector comprises a pair of members being movable with respect to one another and a bladder on at least one of the members. The bladder can comprise a filler within the bladder. The filler can comprise a plurality of jamming particles and a plurality of elongate resilient spacers. The jamming particles are operable to flow within the bladder and to contact and engage with the elongate resilient spacers where flow characteristics vary within the bladder. The bladder with the filler can comprise at least two configurations: a compliant configuration in which a shape of the bladder and filler are changeable, and a stiff configuration in which change in shape of the bladder and filler are resisted.

34 Claims, 8 Drawing Sheets

(56) References Cited

U.S. PATENT DOCUMENTS

| | | |
|---|---|---|
| 3,358,678 A | 12/1967 | Kulstar |
| 3,449,008 A | 6/1969 | Colechia |
| 3,449,769 A | 6/1969 | Mizen |
| 3,535,711 A | 10/1970 | Fick |
| 3,759,563 A | 9/1973 | Kitamura |
| 3,858,468 A | 1/1975 | Pasbrig |
| 4,046,262 A | 9/1977 | Vykukal et al. |
| 4,179,233 A | 12/1979 | Bromell et al. |
| 4,200,596 A | 4/1980 | Iiyama et al. |
| 4,251,791 A | 2/1981 | Yanagisawa et al. |
| 4,367,891 A | 1/1983 | Wauer et al. |
| 4,398,110 A | 8/1983 | Flinchbaugh et al. |
| 4,483,407 A | 11/1984 | Iwamoto et al. |
| 4,561,686 A | 12/1985 | Atchley |
| 4,567,417 A | 1/1986 | Francois et al. |
| 4,575,297 A | 3/1986 | Richter |
| 4,591,944 A | 5/1986 | Gravel |
| 4,598,601 A | 7/1986 | Molaug |
| 4,603,896 A | 8/1986 | Vasseur et al. |
| 4,661,032 A | 4/1987 | Arai |
| 4,666,357 A | 5/1987 | Babbi |
| 4,723,353 A | 2/1988 | Monforte |
| 4,762,455 A | 8/1988 | Coughlan et al. |
| 4,768,143 A | 8/1988 | Lane et al. |
| 4,821,594 A | 4/1989 | Rosheim et al. |
| 4,834,443 A | 5/1989 | Crowder et al. |
| 4,853,874 A | 8/1989 | Iwamoto et al. |
| 4,883,400 A | 11/1989 | Kuban et al. |
| 4,884,720 A | 12/1989 | Whigham et al. |
| 4,915,437 A | 4/1990 | Cherry |
| 4,921,292 A | 5/1990 | Harwell et al. |
| 4,997,095 A | 3/1991 | Jones et al. |
| 5,004,391 A | 4/1991 | Burdea |
| 5,038,089 A | 8/1991 | Szakaly |
| 5,072,361 A | 12/1991 | Davis et al. |
| 5,080,682 A | 1/1992 | Schectman |
| 5,101,472 A | 3/1992 | Repperger |
| 5,105,367 A | 4/1992 | Tsuchihashi et al. |
| 5,117,814 A | 6/1992 | Luttrell et al. |
| 5,144,943 A | 9/1992 | Luttrell et al. |
| 5,172,951 A | 12/1992 | Jacobsen et al. |
| 5,230,147 A | 7/1993 | Asaoka et al. |
| 5,239,246 A | 8/1993 | Kim |
| 5,246,216 A | 9/1993 | Oberst |
| 5,280,981 A | 1/1994 | Schulz |
| 5,282,460 A | 2/1994 | Boldt |
| 5,328,224 A | 7/1994 | Jacobsen et al. |
| 5,336,982 A | 8/1994 | Backes |
| 5,389,849 A | 2/1995 | Asano et al. |
| 5,399,951 A | 3/1995 | Lavallee et al. |
| 5,402,690 A | 4/1995 | Sekiguchi et al. |
| 5,516,249 A | 5/1996 | Brimhall |
| 5,577,417 A | 11/1996 | Fournier |
| 5,577,902 A | 11/1996 | Todo et al. |
| 5,588,688 A | 12/1996 | Jacobsen et al. |
| 5,664,636 A | 9/1997 | Ikuma et al. |
| 5,704,945 A | 1/1998 | Wagner et al. |
| 5,762,390 A | 6/1998 | Gosselin et al. |
| 5,784,542 A | 7/1998 | Ohm et al. |
| 5,785,505 A | 7/1998 | Price |
| 5,797,615 A | 8/1998 | Murray |
| 5,845,540 A | 12/1998 | Rosheim |
| 5,865,770 A | 2/1999 | Schectman |
| 5,898,599 A | 4/1999 | Massie et al. |
| 5,912,658 A | 6/1999 | Bergamasco et al. |
| 5,949,686 A | 9/1999 | Yoshinada et al. |
| 5,957,981 A | 9/1999 | Gramnas |
| 5,961,476 A | 10/1999 | Betto et al. |
| 5,967,580 A | 10/1999 | Rosheim |
| 5,994,864 A | 11/1999 | Inoue et al. |
| 6,016,385 A | 1/2000 | Yee et al. |
| 6,170,162 B1 | 1/2001 | Jacobsen et al. |
| 6,202,013 B1 | 3/2001 | Anderson et al. |
| 6,272,924 B1 | 8/2001 | Jansen |
| 6,301,526 B1 | 10/2001 | Kim et al. |
| 6,338,605 B1 | 1/2002 | Halverson et al. |
| 6,340,065 B1 | 1/2002 | Harris |
| 6,360,166 B1 | 3/2002 | Alster |
| 6,394,731 B1 | 5/2002 | Konosu et al. |
| 6,425,865 B1 | 7/2002 | Salcudean et al. |
| 6,430,473 B1 | 8/2002 | Lee et al. |
| 6,435,794 B1 | 8/2002 | Springer |
| 6,507,163 B1 | 1/2003 | Allen |
| 6,508,058 B1 | 1/2003 | Seaverson |
| 6,554,342 B1 | 4/2003 | Burnett |
| 6,641,371 B2 | 11/2003 | Graziani et al. |
| 6,659,703 B1 | 12/2003 | Kirkley |
| 6,659,939 B2 | 12/2003 | Moll et al. |
| 6,663,154 B2 | 12/2003 | Pancheri |
| 6,714,839 B2 | 3/2004 | Salisbury, Jr. et al. |
| 6,740,125 B2 | 5/2004 | Mosler |
| 6,855,170 B2 | 2/2005 | Gramnas |
| 6,920,374 B2 | 7/2005 | Takenaka et al. |
| 7,168,748 B2 | 1/2007 | Townsend et al. |
| 7,319,919 B2 | 1/2008 | Takenaka et al. |
| 7,337,040 B2 | 2/2008 | Takenaka et al. |
| 7,379,789 B2 | 5/2008 | Takenaka et al. |
| 7,396,057 B2 | 7/2008 | Ye et al. |
| 7,405,531 B2 | 7/2008 | Khatib et al. |
| 7,409,882 B2 | 8/2008 | Massimo et al. |
| 7,410,338 B2 | 8/2008 | Schiele et al. |
| 7,509,905 B2 | 3/2009 | Jacobsen et al. |
| 7,628,766 B1 | 12/2009 | Kazerooni et al. |
| 7,783,384 B2 | 8/2010 | Kraft |
| 7,862,522 B1 | 1/2011 | Barclay et al. |
| 7,862,524 B2 | 1/2011 | Carignan et al. |
| 7,883,546 B2 | 2/2011 | Kazerooni et al. |
| 7,947,004 B2 | 5/2011 | Kazerooni et al. |
| 7,965,006 B2 | 6/2011 | Kang et al. |
| 8,024,071 B2 | 9/2011 | Komatsu et al. |
| 8,051,764 B2 | 11/2011 | Jacobsen et al. |
| 8,100,451 B2 | 1/2012 | Okuda et al. |
| 8,112,179 B2 | 2/2012 | Nakajima |
| 8,132,835 B2 | 3/2012 | Ban et al. |
| 8,151,401 B2 | 4/2012 | Cheyne |
| 8,182,010 B2 | 5/2012 | Lee et al. |
| 8,204,626 B2 | 6/2012 | Yoshiike et al. |
| 8,245,728 B2 | 8/2012 | Jacobsen et al. |
| 8,295,975 B2 | 10/2012 | Arimatsu et al. |
| 8,336,420 B2 | 12/2012 | Carter et al. |
| 8,375,982 B2 | 2/2013 | Gray, Jr. |
| 8,435,309 B2 | 5/2013 | Gilbert et al. |
| 8,452,447 B2 | 5/2013 | Nixon |
| 8,473,101 B2 | 6/2013 | Summer |
| 8,511,192 B2 | 8/2013 | Hirtt et al. |
| 8,516,918 B2 | 8/2013 | Jacobsen et al. |
| 8,529,582 B2 | 9/2013 | Devengenzo et al. |
| 8,534,728 B1 | 9/2013 | Bosscher et al. |
| 8,560,118 B2 | 10/2013 | Greer et al. |
| 8,626,326 B1 | 1/2014 | Theobald et al. |
| 8,640,723 B2 | 2/2014 | Jacobsen et al. |
| 8,651,543 B2 * | 2/2014 | Matsuoka ............ B25J 15/0023 294/192 |
| 8,667,643 B2 | 3/2014 | Simonelli et al. |
| 8,672,378 B2 | 3/2014 | Yamasaki et al. |
| 8,747,486 B2 | 6/2014 | Kawasaki et al. |
| 8,794,262 B2 | 8/2014 | Jacobsen et al. |
| 8,821,338 B2 | 9/2014 | Thorson |
| 8,849,457 B2 | 9/2014 | Jacobsen et al. |
| 8,870,967 B2 | 10/2014 | Herr et al. |
| 8,881,616 B2 | 11/2014 | Dize et al. |
| 8,888,864 B2 | 11/2014 | Iversen et al. |
| 8,892,258 B2 | 11/2014 | Jacobsen et al. |
| 8,920,517 B2 | 12/2014 | Smith et al. |
| 8,942,846 B2 | 1/2015 | Jacobsen et al. |
| 8,977,388 B2 | 3/2015 | Jacobsen et al. |
| 8,977,398 B2 | 3/2015 | Jacobsen et al. |
| 9,079,305 B2 | 7/2015 | Williamson et al. |
| 9,205,560 B1 | 12/2015 | Edsinger et al. |
| 9,295,604 B2 | 3/2016 | Zoss et al. |
| 9,314,921 B2 | 4/2016 | Jacobsen et al. |
| 9,329,587 B2 | 5/2016 | Fudaba et al. |
| 9,333,097 B2 | 5/2016 | Herr et al. |
| 9,346,165 B1 | 5/2016 | Metzger et al. |

(56) References Cited

U.S. PATENT DOCUMENTS

| | | |
|---|---|---|
| 9,446,510 B2 | 9/2016 | Vu et al. |
| 9,526,636 B2 | 12/2016 | Bedard et al. |
| 9,533,411 B2 | 1/2017 | Jacobsen et al. |
| 9,616,580 B2 | 4/2017 | Smith et al. |
| 9,618,937 B1 | 4/2017 | Blankespoor et al. |
| 9,643,323 B2 | 5/2017 | Nagatsuka et al. |
| 9,727,076 B2 | 8/2017 | Smith et al. |
| 9,789,603 B2 | 10/2017 | Jacobsen et al. |
| 9,862,090 B2 | 1/2018 | Kennedy et al. |
| 9,895,812 B2 | 2/2018 | Gonzalez et al. |
| 9,926,025 B1 | 3/2018 | Blankespoor et al. |
| 10,028,844 B2 | 7/2018 | Cheng et al. |
| 10,071,485 B2 | 9/2018 | Schiele et al. |
| 10,216,177 B2 | 2/2019 | Gildert et al. |
| 10,300,969 B1 | 5/2019 | Blackespoor et al. |
| 10,390,974 B2 | 8/2019 | Clausen et al. |
| 10,406,676 B2 | 9/2019 | Smith et al. |
| 10,512,583 B2 | 12/2019 | Smith |
| 10,518,404 B2 | 12/2019 | Barnes |
| 10,533,542 B2 | 1/2020 | Smith et al. |
| 10,561,564 B2 | 2/2020 | LaChappelle et al. |
| 10,566,914 B2 | 2/2020 | Fujita et al. |
| 10,609,896 B2 | 4/2020 | Kraaij et al. |
| 10,709,633 B2 | 7/2020 | Kazerooni et al. |
| 10,765,537 B2 | 9/2020 | Smith et al. |
| 10,828,767 B2 | 11/2020 | Smith et al. |
| 11,148,279 B1 | 10/2021 | Mooney et al. |
| 11,241,801 B2 | 2/2022 | Smith et al. |
| 11,426,882 B2 * | 8/2022 | Takahashi ............ B25J 15/0616 |
| 11,697,497 B2 | 7/2023 | Smith et al. |
| 11,717,956 B1 | 8/2023 | Smith et al. |
| 11,738,452 B1 | 8/2023 | Smith et al. |
| 2001/0033146 A1 | 10/2001 | Kato et al. |
| 2001/0043847 A1 | 11/2001 | Kramer |
| 2002/0075233 A1 | 6/2002 | White et al. |
| 2002/0094919 A1 | 7/2002 | Rennex et al. |
| 2003/0005896 A1 | 1/2003 | Jacobsen et al. |
| 2003/0060808 A1 | 3/2003 | Wilk |
| 2003/0146720 A1 | 8/2003 | Riwan et al. |
| 2003/0152452 A1 | 8/2003 | Hodgson |
| 2003/0223844 A1 | 12/2003 | Schiele et al. |
| 2004/0004362 A1 | 1/2004 | Love |
| 2004/0037681 A1 | 2/2004 | Marcotte |
| 2004/0102723 A1 | 5/2004 | Horst |
| 2004/0106881 A1 | 6/2004 | McBean et al. |
| 2004/0116836 A1 | 6/2004 | Kawai et al. |
| 2004/0246769 A1 | 12/2004 | Ido |
| 2004/0250644 A1 | 12/2004 | Gosselin et al. |
| 2005/0059908 A1 | 3/2005 | Bogert |
| 2005/0099386 A1 | 5/2005 | Kukita |
| 2005/0159850 A1 | 7/2005 | Melman |
| 2005/0166413 A1 | 8/2005 | Crampton |
| 2005/0193451 A1 | 9/2005 | Quistgaard et al. |
| 2005/0251110 A1 | 11/2005 | Nixon |
| 2006/0052732 A1 | 3/2006 | Shimada et al. |
| 2006/0064047 A1 | 3/2006 | Shimada et al. |
| 2006/0069449 A1 | 3/2006 | Bisbee, III et al. |
| 2006/0130594 A1 | 6/2006 | Ikeuchi |
| 2006/0149419 A1 | 7/2006 | Ogawa et al. |
| 2006/0184275 A1 | 8/2006 | Hosokawa et al. |
| 2006/0197049 A1 | 9/2006 | Hamada et al. |
| 2006/0245897 A1 | 11/2006 | Hariki et al. |
| 2006/0249315 A1 | 11/2006 | Herr et al. |
| 2007/0054777 A1 | 3/2007 | Kawai et al. |
| 2007/0056592 A1 | 3/2007 | Angold et al. |
| 2007/0105070 A1 | 5/2007 | Trawick |
| 2007/0123997 A1 | 5/2007 | Herr et al. |
| 2007/0129653 A1 | 6/2007 | Sugar et al. |
| 2008/0009771 A1 | 1/2008 | Perry et al. |
| 2008/0023974 A1 | 1/2008 | Park et al. |
| 2008/0156363 A1 | 7/2008 | Ikeuchi et al. |
| 2008/0269027 A1 | 10/2008 | Chen |
| 2008/0271942 A1 | 11/2008 | Yamashita et al. |
| 2008/0281468 A1 | 11/2008 | Jacobsen et al. |
| 2009/0036815 A1 | 2/2009 | Ido |
| 2009/0038258 A1 | 2/2009 | Pivac et al. |
| 2009/0039579 A1 | 2/2009 | Clifford et al. |
| 2009/0149993 A1 | 6/2009 | Neki et al. |
| 2009/0199883 A1 | 8/2009 | Hiki |
| 2009/0210093 A1 | 8/2009 | Jacobsen et al. |
| 2009/0294238 A1 | 12/2009 | Gilmore |
| 2010/0017033 A1 | 1/2010 | Boca |
| 2010/0050947 A1 | 3/2010 | Kortekaas |
| 2010/0089855 A1 | 4/2010 | Kjolseth |
| 2010/0094185 A1 | 4/2010 | Amundson et al. |
| 2010/0152630 A1 | 6/2010 | Matsuoka et al. |
| 2010/0198402 A1 | 8/2010 | Greer et al. |
| 2010/0234996 A1 | 9/2010 | Schreiber et al. |
| 2010/0241242 A1 | 9/2010 | Herr et al. |
| 2010/0295497 A1 | 11/2010 | Takamatsu |
| 2011/0010012 A1 | 1/2011 | Murayama et al. |
| 2011/0015786 A1 | 1/2011 | Kawai |
| 2011/0040216 A1 | 2/2011 | Herr et al. |
| 2011/0046781 A1 | 2/2011 | Summer |
| 2011/0066088 A1 | 3/2011 | Little et al. |
| 2011/0071677 A1 | 3/2011 | Stillman |
| 2011/0214524 A1 | 9/2011 | Jacobsen et al. |
| 2011/0219899 A1 | 9/2011 | Dize et al. |
| 2011/0264230 A1 | 10/2011 | Herr et al. |
| 2012/0000891 A1 | 1/2012 | Nakanishi et al. |
| 2012/0060322 A1 | 3/2012 | Simonelli et al. |
| 2012/0065902 A1 | 3/2012 | Nakajima |
| 2012/0073930 A1 | 3/2012 | Lansberry et al. |
| 2012/0137667 A1 | 6/2012 | Jacobsen et al. |
| 2012/0179075 A1 | 7/2012 | Perry et al. |
| 2012/0191245 A1 | 7/2012 | Fudaba et al. |
| 2012/0216671 A1 | 8/2012 | Gammon |
| 2012/0237319 A1 | 9/2012 | Jacobsen et al. |
| 2012/0259429 A1 | 10/2012 | Han et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 | 12/2012 | Jacobsen et al. |
| 2013/0011220 A1 | 1/2013 | Jacobsen et al. |
| 2013/0013108 A1 | 1/2013 | Jacobsen et al. |
| 2013/0023803 A1 | 1/2013 | Hsu et al. |
| 2013/0033050 A1 | 2/2013 | Matsuoka et al. |
| 2013/0057001 A1 | 3/2013 | Tsai |
| 2013/0090580 A1 | 4/2013 | Hong et al. |
| 2013/0106127 A1 | 5/2013 | Lipson et al. |
| 2013/0106128 A1 | 5/2013 | Yamasaki et al. |
| 2013/0192406 A1 | 8/2013 | Godowski |
| 2013/0223204 A1 | 8/2013 | Angst et al. |
| 2013/0226048 A1 | 8/2013 | Unluhisarcikili et al. |
| 2013/0253385 A1 | 9/2013 | Goffer et al. |
| 2013/0296746 A1 | 11/2013 | Herr et al. |
| 2013/0302129 A1 | 11/2013 | Smith et al. |
| 2013/0306430 A1 | 11/2013 | Laffranchi et al. |
| 2013/0331744 A1 | 12/2013 | Kamon |
| 2013/0333368 A1 | 12/2013 | Durfee et al. |
| 2014/0067124 A1 | 3/2014 | Williamson et al. |
| 2014/0088728 A1 | 3/2014 | Herr |
| 2014/0100492 A1 | 4/2014 | Nagasaka |
| 2014/0190289 A1 | 7/2014 | Zhu |
| 2014/0195052 A1 | 7/2014 | Tsusaka et al. |
| 2015/0073595 A1 | 3/2015 | Fudaba et al. |
| 2015/0073596 A1 | 3/2015 | Fudaba et al. |
| 2015/0173929 A1 | 6/2015 | Kazerooni et al. |
| 2015/0209214 A1 | 7/2015 | Herr et al. |
| 2015/0217457 A1 | 8/2015 | Lipson et al. |
| 2015/0224638 A1 | 8/2015 | Dockter |
| 2015/0272749 A1 | 10/2015 | Amend, Jr. et al. |
| 2015/0278263 A1 | 10/2015 | Bowles et al. |
| 2015/0289995 A1 | 10/2015 | Wilkinson et al. |
| 2015/0321340 A1 | 11/2015 | Smith |
| 2015/0321342 A1 | 11/2015 | Smith et al. |
| 2015/0351995 A1 | 12/2015 | Zoss et al. |
| 2016/0003268 A1 | 1/2016 | Shevchenko et al. |
| 2016/0114482 A1 | 4/2016 | Lessing et al. |
| 2016/0153508 A1 | 6/2016 | Battlogg |
| 2016/0279788 A1 | 9/2016 | Kanaoka et al. |
| 2016/0279793 A1 | 9/2016 | Sisbot |
| 2016/0331556 A1 | 11/2016 | Wijesundara et al. |
| 2016/0331572 A1 | 11/2016 | Popovic et al. |

(56) References Cited

U.S. PATENT DOCUMENTS

| | | | |
|---|---|---|---|
| 2016/0332302 | A1 | 11/2016 | Bingham et al. |
| 2016/0332305 | A1 | 11/2016 | Gonzalez et al. |
| 2016/0332312 | A1 | 11/2016 | Song et al. |
| 2017/0050310 | A1 | 2/2017 | Kanaoka |
| 2017/0119132 | A1 | 5/2017 | Pruess et al. |
| 2017/0326737 | A1 | 11/2017 | Martin et al. |
| 2018/0098864 | A1 | 4/2018 | Auberger et al. |
| 2018/0126548 | A1 | 5/2018 | Sugito et al. |
| 2018/0133905 | A1 | 5/2018 | Smith et al. |
| 2018/0133906 | A1 | 5/2018 | Smith et al. |
| 2018/0193172 | A1 | 7/2018 | Smith et al. |
| 2018/0193999 | A1 | 7/2018 | Jacobsen et al. |
| 2018/0194000 | A1 | 7/2018 | Smith et al. |
| 2018/0221237 | A1 | 8/2018 | Swift et al. |
| 2018/0290309 | A1 | 10/2018 | Becker et al. |
| 2018/0298976 | A1 | 10/2018 | Battlogg |
| 2019/0022853 | A1 | 1/2019 | Kim et al. |
| 2019/0042509 | A1 | 2/2019 | Buhlman et al. |
| 2019/0105777 | A1 | 4/2019 | Dalley et al. |
| 2019/0138423 | A1 | 5/2019 | Agerstam et al. |
| 2019/0176320 | A1 | 6/2019 | Smith et al. |
| 2019/0184576 | A1 | 6/2019 | Smith et al. |
| 2019/0217482 | A1* | 7/2019 | Ishida .............. B25J 15/0028 |
| 2019/0254854 | A1 | 8/2019 | Lee et al. |
| 2019/0328937 | A1 | 10/2019 | Kim et al. |
| 2020/0001450 | A1 | 1/2020 | Smith et al. |
| 2020/0067570 | A1 | 2/2020 | Bauer et al. |
| 2020/0164523 | A1 | 5/2020 | Hallock et al. |
| 2020/0206948 | A1 | 7/2020 | Olivier et al. |
| 2020/0215701 | A1* | 7/2020 | Takahashi ............. B25J 15/12 |
| 2020/0281803 | A1 | 9/2020 | Teng et al. |
| 2020/0312109 | A1 | 10/2020 | Shionozaki |
| 2020/0346009 | A1 | 11/2020 | Murray et al. |
| 2020/0368094 | A1 | 11/2020 | Yoshimi et al. |
| 2020/0405417 | A1 | 12/2020 | Shelton, IV et al. |
| 2021/0023693 | A1 | 1/2021 | Berger et al. |
| 2021/0039269 | A1 | 2/2021 | Son |
| 2021/0059780 | A1 | 3/2021 | Sutherland et al. |
| 2021/0369536 | A1 | 12/2021 | Mooney et al. |
| 2021/0378903 | A1 | 12/2021 | Mooney et al. |
| 2022/0105633 | A1 | 4/2022 | Stoeffler et al. |
| 2022/0117825 | A1 | 4/2022 | Yuan |
| 2022/0176561 | A1 | 6/2022 | Smith et al. |
| 2023/0023083 | A1 | 1/2023 | Shelton, IV et al. |
| 2023/0165649 | A1 | 6/2023 | Fitzsimons et al. |

FOREIGN PATENT DOCUMENTS

| | | |
|---|---|---|
| CN | 101121424 B | 2/2011 |
| CN | 101486191 B | 11/2012 |
| CN | 103610524 A | 3/2014 |
| CN | 203495949 U | 3/2014 |
| CN | 103802907 A | 5/2014 |
| CN | 203752160 U | 8/2014 |
| CN | 104843484 A | 8/2015 |
| CN | 105411813 A | 3/2016 |
| CN | 205250544 U | 5/2016 |
| CN | 105818143 A | 8/2016 |
| CN | 105856190 A | 8/2016 |
| CN | 106264989 A | 1/2017 |
| CN | 107471203 A | 12/2017 |
| CN | 108081303 A | 5/2018 |
| CN | 106426097 B | 6/2018 |
| CN | 109431752 A | 3/2019 |
| CN | 111267992 A | 6/2020 |
| CN | 111450492 A | 7/2020 |
| CN | 111616914 A | 9/2020 |
| CN | 109262596 B | 10/2020 |
| CN | 112237528 A | 1/2021 |
| CN | 112692812 A | 4/2021 |
| CN | 112891150 A | 6/2021 |
| CN | 114260881 A | 4/2022 |
| DE | 102004029513 B3 | 9/2005 |
| DE | 102010023914 A1 | 9/2011 |
| DE | 102010029088 A1 | 11/2011 |
| DE | 202013009698 U1 | 11/2013 |
| DE | 102016201540 A1 | 8/2017 |
| DE | 202018104980 U1 | 10/2018 |
| EP | 0039578 A1 | 11/1981 |
| EP | 0616275 A3 | 9/1998 |
| EP | 1037264 A2 | 9/2000 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2548543 B1 | 1/2015 |
| EP | 2942162 A2 | 11/2015 |
| EP | 2168548 B1 | 10/2016 |
| EP | 3326759 A1 | 5/2018 |
| EP | 3326760 A1 | 5/2018 |
| EP | 3536297 A1 | 9/2019 |
| FR | 2651220 A1 | 3/1991 |
| GB | 686237 A | 1/1953 |
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | S56-114688 A | 9/1981 |
| JP | S56-140510 A | 11/1981 |
| JP | S58-113586 A | 7/1983 |
| JP | S58-45724 B2 | 10/1983 |
| JP | S60-177883 U | 11/1985 |
| JP | S62-193784 A | 8/1987 |
| JP | S62-200600 A | 9/1987 |
| JP | H01-295772 A | 11/1989 |
| JP | H02-51083 U | 4/1990 |
| JP | H02-298480 | 12/1990 |
| JP | H03-85398 U | 8/1991 |
| JP | H04-44296 U | 4/1992 |
| JP | H05-004177 A | 1/1993 |
| JP | H05-023989 A | 2/1993 |
| JP | H06-213266 A | 8/1994 |
| JP | H06-315879 A | 11/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H09-11176 A | 1/1997 |
| JP | H09-190207 A | 7/1997 |
| JP | H1156931 | 3/1999 |
| JP | H11-130279 A | 5/1999 |
| JP | 2002-161547 A | 6/2002 |
| JP | 2003-089084 A | 3/2003 |
| JP | 2003-103480 A | 4/2003 |
| JP | 2003-146575 A | 5/2003 |
| JP | 2003-194104 A | 7/2003 |
| JP | 2004-041279 A | 2/2004 |
| JP | 2004-105261 A | 4/2004 |
| JP | 2004-195576 A | 7/2004 |
| JP | 2005-118938 A | 5/2005 |
| JP | 2005-237504 A | 9/2005 |
| JP | 2005-334999 A | 12/2005 |
| JP | 2006-007337 A | 1/2006 |
| JP | 2006-016916 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |

(56) References Cited

FOREIGN PATENT DOCUMENTS

| | | |
|---|---|---|
| JP | 2009-268839 A | 11/2009 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2010-263761 A | 11/2010 |
| JP | 2011-067941 A | 4/2011 |
| JP | 2011-073127 A | 4/2011 |
| JP | 2011-156171 A | 8/2011 |
| JP | 2011-193899 A | 10/2011 |
| JP | 2011-230260 A | 11/2011 |
| JP | 2012-501739 A | 1/2012 |
| JP | 2012-125279 A | 7/2012 |
| JP | 2012-176476 A | 9/2012 |
| JP | 2012-183291 A | 9/2012 |
| JP | 2013-022091 A | 2/2013 |
| JP | 2013-090693 A | 5/2013 |
| JP | 2013-123786 A | 6/2013 |
| JP | 2013-142445 A | 7/2013 |
| JP | 5267730 | 8/2013 |
| JP | 2013-176429 A | 9/2013 |
| JP | 2013-208293 A | 10/2013 |
| JP | 2013-220496 A | 10/2013 |
| JP | 2013-248699 A | 12/2013 |
| JP | 2014-054273 A | 3/2014 |
| JP | 2014-073199 A | 4/2014 |
| JP | 2014-073222 A | 4/2014 |
| JP | 2014-200853 A | 10/2014 |
| JP | 2015-020246 A | 2/2015 |
| JP | 2015-112649 A | 6/2015 |
| JP | 2015-208614 A | 11/2015 |
| JP | 2015-212010 A | 11/2015 |
| JP | 2015-214019 A | 12/2015 |
| JP | 2016-539017 A | 12/2016 |
| JP | 2018-143572 A | 9/2018 |
| JP | 2018-167375 A | 11/2018 |
| JP | 2020-037164 A | 3/2020 |
| JP | 6748374 B2 | 9/2020 |
| JP | 2022-113444 A | 8/2022 |
| KR | 2005-0037754 A | 4/2005 |
| KR | 2007-0057209 A | 6/2007 |
| KR | 2010-0112670 | 10/2010 |
| KR | 10-1025512 B1 | 4/2011 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| KR | 2018-0128731 A | 12/2018 |
| KR | 2019-0108386 A | 9/2019 |
| SE | 515372 C2 | 7/2001 |
| WO | WO 94/29605 A1 | 12/1994 |
| WO | WO 2003/002309 A1 | 1/2003 |
| WO | WO 2003/081762 A1 | 10/2003 |
| WO | WO 2007/144629 A2 | 12/2007 |
| WO | WO 2009/040908 A1 | 4/2009 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2015/123128 A1 | 8/2015 |
| WO | WO 2016/049622 A1 | 3/2016 |
| WO | WO 2017/148499 A1 | 9/2017 |
| WO | WO 2017/159504 A1 | 9/2017 |
| WO | WO 2018/118004 A1 | 6/2018 |
| WO | WO 2018/211869 A1 | 11/2018 |
| WO | WO 2018/215705 A1 | 11/2018 |
| WO | WO 2019/060791 A1 | 3/2019 |
| WO | WO 2020/175949 A1 | 9/2020 |
| WO | WO 2021/053623 A1 | 3/2021 |

OTHER PUBLICATIONS

Invitation to Pay Additional Fees for International Application No. PCT/US2023/074396 dated Dec. 19, 2023, 11 pages.
Partial European Search Report for European Application No. 23192598.3 dated Jan. 4, 2024, 12 pages.
Aghili et al., Sensing the torque in a robot's joints, www.memagazine.org/backissues/september98/features/torque/torque.btml, 1998, pp. 1-9, The American Society of Mechanical Engineers.
Albu-Schaffer et al., A Unified Passivity Based Control Framework for Position, Torque and Impedance Control of Flexible Joint Robots, Institute of Robotics and Mechatronics, 2007, vol. 26, 17 pages, Germany.
Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/tt10090605/.
Amikabir University of Technology, Manipulator Dynamics (Power Point), Computer Engineering and Information Technology Department, to the best of applicant's knowledge article was available before the application filing date, 44 pages.
Bao et al., A unified modeling and control design for precision transmission system with friction and backlash, Advances in Mechanical Engineering, 2016, vol. 8(5), 11 pages.
Barras, Stabilization of a Biped Robot with its arms—A Practical Approach, http://biorob.eptfl.ch/files/content/sites/biorob/filed/users/170220/public/Report.pdf; May 2010, 33 pages, EPFL Biorobotics Laboratory (BioRob), Switzerland.
Bauman, Utah Firm Markets on Big Gorilla of an Arm, Deseret News; Jan. 27, 1993, 2 pages, Deseret News Publishing Company, Salt Lake City, Utah.
Claeyssen et al., Magnetostrictive actuators compared to piezoelectric actuators, Proceedings of SPIE—The International Society for Optical Engineering 4763, Mar. 2003, 6 pages.
David et al., Study of an External Passive Shock-absorbing Mechanism for Walking Robots, 8th IEEE International Conference on Humanoid Robots, Dec. 1-3, 2008, pp. 435-440, Institute of Electrical and Electronics Engineers, Piscataway, New Jersey.
Desai et al., Robust Swing Leg Placement under Leg Disturbances, 2012 IEEE International Conference on Robotics and Biomimetics, Dec. 11-14, 2012, pp. 265-270, China.
Digital World Tokyo, Giant Robot Grabbing Hands Grab All They Can, www.digitalworldtokyo.com/index.php/digital_tokyo/articles/giant_robot_grabbing_hands_grab_all_they_can/, Jul. 17, 2007, 3 pages.
Elliott et al., The Biomechanics and Energetics of Human Running using an Elastic Knee Exoskeleton, Jun. 2013, 7 pages, IEEE International Conference on Rehabilitation Robotics, Seattle, Washington.
Elliott et al., Design of a Clutch-Spring Knee Exoskeleton for Running, Journal of Medical Devices, Sep. 2014, 11 pages, vol. 8, The American Society of Mechanical Engineers, New York City, New York.
Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.
Filippeschi et al., Survey of Motion Tracking Methods on Inertial Sensors: A Focus on Upper Limb Human Motion, www.mdpi.com/journal/sensors, 2017, 40 pages, Sensors, Switzerland.
Gauthier et al., Magnetic Shape Memory Alloy and Actuator Design, Conference: 5th International Workshop on Microfactories (IWMF'06), Oct. 2006, 5 pages, Besançon, France.
Grabowski et al., Exoskeletons for Running and Hopping Augmentation, Journal of Applied Physiology, http://biomech.media.mit.edu/portfolio_page/load-bearing-exoskeleton-for-augmentation-of-human-running/, 2009, 4 pages, vol. 107, No. 3, American Physiological Society, United States.
Hauser et al., JammJoint: A Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.

(56) References Cited

OTHER PUBLICATIONS

Huber et al., The selection of mechanical actuators based on performance indices, Oct. 8, 1997, pp. 2185-2205, vol. 453 Issue 1965, The Royal Society, London.

Hunter et al., Fast Reversible NiTi Fibers For Use In Microrobotics, Proceedings. IEEE Micro Electro Mechanical Systems, Jan. 30-Feb. 2, 1991, pp. 166-170, Institute of Electrical and Electronics Engineers, Piscataway, New Jersey.

Industrial Magnetics, Inc., PowerLift® Magnets; www.magnetics.com/product.asp?ProductID=1; as accessed Nov. 6, 2012, 2 pages; Boyne City, Michigan.

Jacobsen et al., Design of the Utah/M.I.T. Dextrous Hand, IEEE International Conference on Robotics and Automation, 1986, pp. 1520-1532, Institute of Electrical and Electronics Engineers, Piscataway, New Jersey.

Jacobsen et al., Development of the Utah Artificial Arm, IEEE Transactions on Biomedical Engineering, Apr. 1982, pp. 249-269, vol. BME-29, No. 4, Institute of Electrical and Electronics Engineers, Piscataway, New Jersey.

Jacobsen et al., Research Robots for Application in AI, Teleoperation and Entertainment, Proceedings of the International Fluid Power Exposition and Technical Conference, Mar. 24-24, 1992, pp. 1-19, Chicago, Illinois.

Jacobsen et al., Research Robots for Applications in Artificial Intelligence, Teleoperation and Entertainment; The International Journal of Robotics Research; Apr.-May 2004, pp. 319-330, vol. 23, No. 4-5, SAGE Publications, Thousand Oaks, California.

Jacobsen, Science, Robotics, and Superheroes, Presented at Department of Science University of Utah Science at Breakfast, Mar. 17, 2010, 16 pages.

Jafari et al., A Novel Actuator with Adjustable Stiffness (AwAS), Oct. 18-22, 2010, 6 pages, IEEE/RSJ International Conference on Intelligent Robots and Systems, Taiwan.

Jansen et al., Exoskeleton for Soldier Enhancement Systems Feasibility Study, Sep. 2000, 44 pages, Oak Ridge National Laboratory, Oak Ridge, Tennessee.

Kaslin et al., Towards a Passive Adaptive Planar Foot with Ground Orientation and Contact Force Sensing for Legged Robots, IEEE International Conference on Intelligent Robots and Systems, Oct. 1-5, 2018, pp. 2707-2714, Institute of Electrical and Electronics Engineers, Piscataway, New Jersey.

Kazerooni, Berkeley Lower Extremity Exoskeleton (BLEEX), to the best of applicant's knowledge article was available before the application filing date, 3 pages, University of California, Berkeley, Berkeley, California.

Kim, Development of a small 6-axis force/moment sensor for robot's fingers, Measurement Science and Technology, Sep. 30, 2004, 2 pages, Issue 11, Institute of Physics and IOP Publishing Limited.

Kim et al., A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.

Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon University Mechanical Engineering, Pittsburgh, Pennsylvania.

Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.

Liu et al., Cat-inspired Mechanical Design of Self-Adaptive Toes for a Legged Robot, IEEE International Conference on Intelligent Robots and Systems, Oct. 9-14, 2016, pp. 2425-2430, Institute of Electrical and Electronics Engineers, Piscataway, New Jersey.

Liu et al., Concept and Design of a Lightweight Biped Robot for Walking on Rough Terrain, IEEE International Conference on Robotics and Biomimetics, 2017, 6 pages, Institute of Electrical and Electronics Engineers, Piscataway, New Jersey.

Magnetic Base, www.ask.com/wiki/magnetic_base; page last updated Sep. 12, 2012, 2 pages, retrieved from www.ask.com/wiki/magnetic_base.

Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.

Mirfakhrai et al., Polymer artificial muscles, materialstoday, Apr. 2007, pp. 30-38, vol. 10 No. 4, Elsevier, Netherlands.

Mombaur et al., HEiKA-EXO: Optimization-based development and control of an exoskeleton for medical applications, http://typo.iwr.uni-heidelberg.de/groups/orb/research/heika-exo/, Optimization in Robotics & Biomechanics, Oct. 20, 2014, 3 pages, Germany.

Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.

Newport Corporation, Heavy-Duty Magnetic Base, 300 lb (1334 N) Holding Force, $1/4$-20 Thread, http://search.newport.com/?q=*&x2=sku&q2=200, as accessed Apr. 23, 2011, 1 page, Irvine, CA.

Oak Ridge National Laboratory, Foot Force-Torque Sensor Novel Sensor for Measuring Forces and Torques at the Foot, www.ornl.gov, to the best of applicant's knowledge article was available before the application filing date, 1 page, Oak Ridge National Laboratory, Oak Ridge, Tennessee.

Omega, Load Cell Designs, www.omega.com/literature/transactions/volume3/load3.html, Nov. 1, 2005, 3 pages.

Ostling, Wearable Robots, Technology Review, Jul./Aug. 2004, pp. 70-73, Elizabeth Bramson-Boudreau, Cambridge, Massachusetts.

Ott et al., Admittance Control using a Base Force/Torque Sensor, Department of Mechano-Informatics, 2009, 6 pages, University of Tokyo, Japan.

Pan, Improved Design of a Three-degree of Freedom Hip Exoskeleton Based on Biomimetic Parallel Structure, Jul. 2011, 132 pages, University of Ontario Institute of Technology, Canada.

Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.

Pelrine et al., High-field deformation of elastomeric dielectrics for actuators, Materials Science and Engineering, Nov. 28, 2000, pp. 89-100, vol. 11 Issue 2, Elsevier, Netherlands.

Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.

Pin, Wearable Robotics Presented to New Horizons in Science Briefing, Oct. 2003, 34 pages, Knoxville, Tennessee.

Pratt et al., The RoboKnee: An Exoskeleton for Enhancing Strength and Endurance During Walking, International Conference on Robotics & Automation, Apr. 2004, 6 pages, IEEE, New Orleans, LA.

Robotics Research Group, Degrees of Freedom, www.robotics.utexas.edu/rrg/learn_more/low_ed/dof/, Oct. 25, 2006, 2 pages, University of Texas.

Roetenberg et al., Xsens MVN: Full 6DOF Human Motion Tracking Using Miniature Inertial Sensors, XSENS—Inertial Motion Capture, Jan. 2009, 9 pages, XSENS Technologies.

Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.

Schuler et al., Dextrous Robot Arm, in Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.

Searchmap Blog, Scientists Develop Mechanical Spring-Loaded Leg Brace to Improve Walking, http://www.searchmap.en/blog/scientists-develop-mechanical-spring-loaded-leg-brace-to-improve-walking/, Apr. 1, 2015, 5 pages, Searchmap Blog.

(56) References Cited

OTHER PUBLICATIONS

Seppala, These exoskeleton heels could help stroke victims walk again, https://www.engadget.com/2015/04/02/feet-exoskeletons/, Apr. 2, 2015, Engadget, San Francisco, California.
Shamaei et al., Estimation of Quasi-Stiffness of the Human Knee in the Stance Phase of Walking, Mar. 22, 2013, 10 pages, vol. 8 Issue 3, PLOS One, San Francisco, California.
Siddharth et al., Design and Analysis of a 1-DOF Walking Mechanism, http://siddharthswaminathan.in/files/WalkingMechanism.pdf, Nov. 2012, 7 pages, India.
Smith et al., Integrated thin-film piezoelectric traveling wave ultrasonic motors, Sensors and Actuators A: Physical, Dec. 2012, pp. 305-311, vol. 188, Elsevier, Netherlands.
Song et al, Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.
Suitx, Phoenix Medical Exoskeleton, https://www.suitx.com/phoenix-medical-exoskeleton, 3 pages, to the best of the applicant's knowledge article was available before the application filing date, US Bionics, Inc., Berkeley, California.
Suleiman, Engineering an affordable exoskeleton, Phys.org, https://phys.org/news/2014-06-exoskeleton.html, Jun. 12, 2014, 5 pages, Science X Network.
Szczesna et al., Inertial Motion Capture Costume Design Study, 2017, 21 pages, Sensors, Switzerland.
Tmsuk, Rescue Robot "T-53" release Control Technologies to Control the Synchronous Operation of the Arm, http:/robot.watch.impress.co.jp/cda/news/2007/07/18/564.html, as accessed Sep. 1, 2011 5 pages, Robot Watch website.
Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.
Vanderborght et al., Variable impedance actuators: A review, Robotics and Autonomous Systems, Dec. 2013, 14 pages, vol. 61, Issue 12, Elsevier, Netherlands.
Walsh, Biomimetic Design of an Under-Actuated Leg Exoskeleton For Load-Carrying Augmentation, Massachusetts Institute of Technology, Feb. 2006, 97 pages, Massachusetts.
Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.
Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.
Yeates, Utah-built robot safeguards the workplace, http://www.ksl.com?nid=148&sid=17654421&autostart=y; Oct. 13, 2011, 3 pages, KSL Broadcasting, Salt Lake City, Utah.
Yip et al., High-Performance Robotic Muscles from Conductive Nylon Sewing Thread, 2015 IEEE International Conference on Robotics and Automation (ICRA), May 26-30, 2015, 6 pages, Seattle, Washington.
Zubrycki et al., Novel haptic glove-based interface using jamming principle, Proceedings of the 10$^{th}$ International Workshop on Robot Motion and Control, Jul. 6-8, 2015, 6 pages, IEEE, Poland.
International Search Report for International Application No. PCT/US2023/078847 dated Mar. 11, 2024, 12 pages.
International Search Report for International Application No. PCT/US2023/080394 dated Mar. 11, 2024, 11 pages.
International Search Report for International Application No. PCT/US2023/080401 dated Feb. 28, 2024, 12 pages.
International Search Report for International Application No. PCT/US2023/036723 dated Mar. 1, 2024, 13 pages.
International Search Report for International Application No. PCT/US2024/010604 dated Apr. 23, 2024, 12 pages.

* cited by examiner

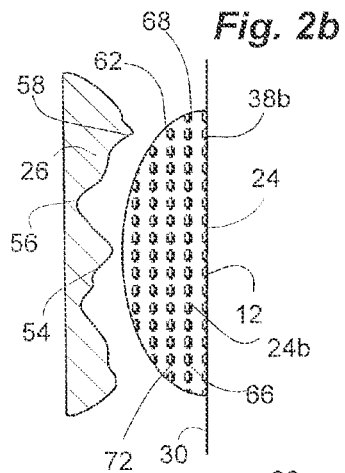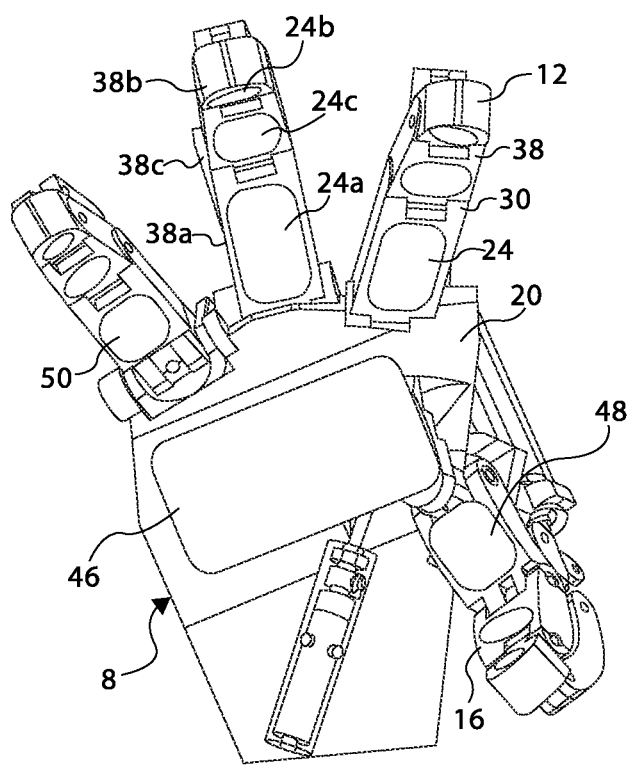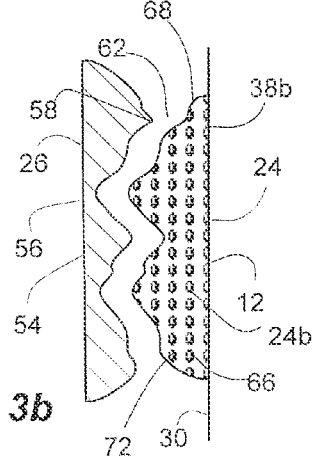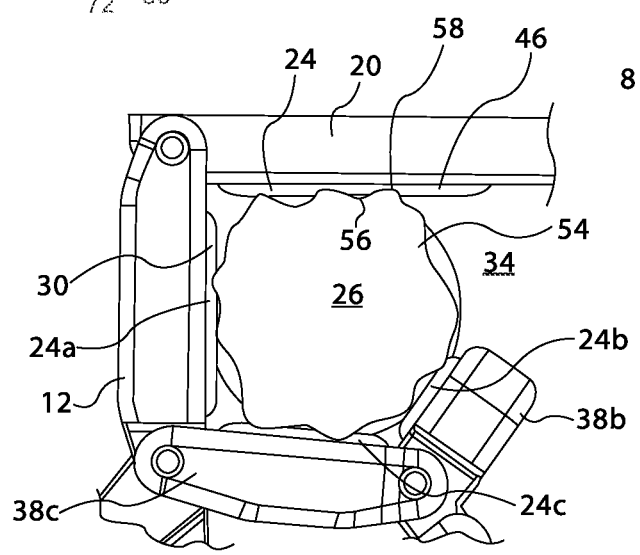

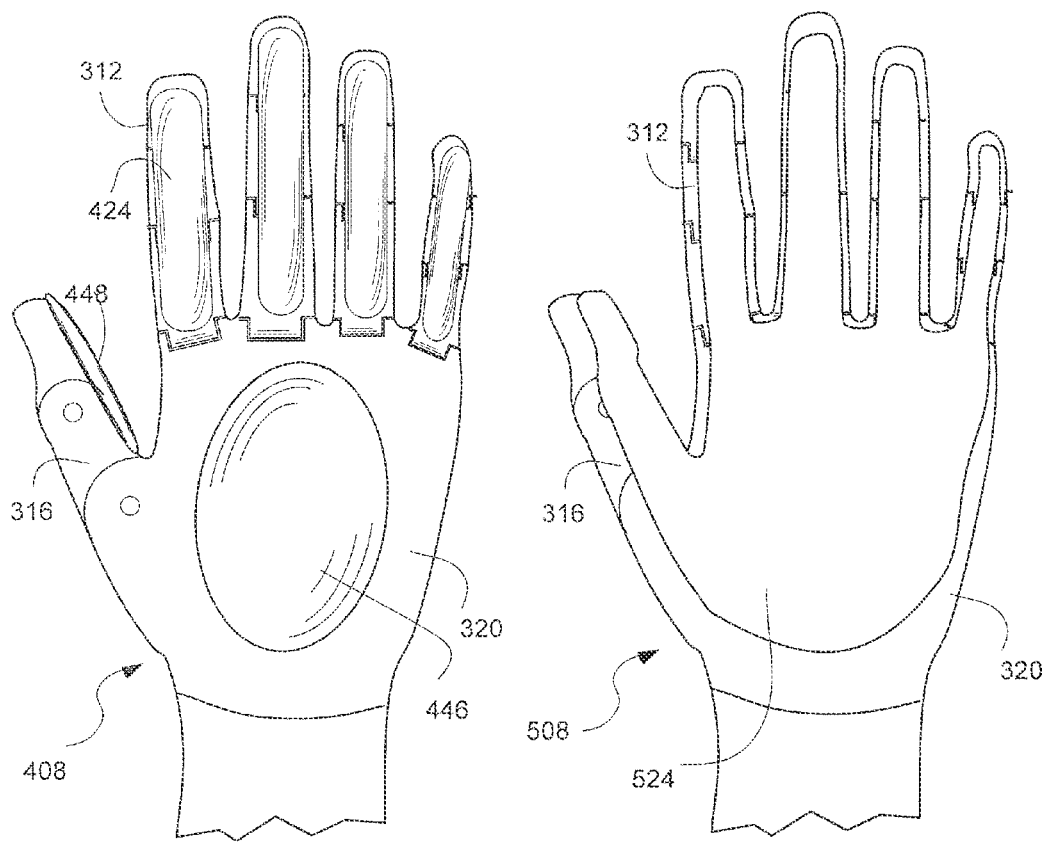
*Fig. 13*
*Fig. 14a*
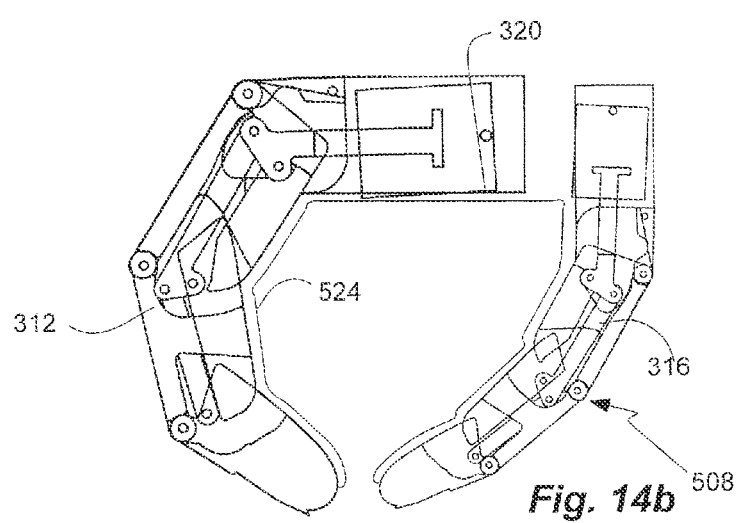
*Fig. 14b*

ROBOTIC END-EFFECTOR HAVING DYNAMIC STIFFENING ELEMENTS WITH RESILIENT SPACERS FOR CONFORMING OBJECT INTERACTION

RELATED APPLICATIONS

This application claims the benefit of U.S. Provisional Patent Application No. 63/422,870, filed Nov. 4, 2022, entitled, "Robotic End-Effector Having Dynamic Stiffening Elements with Resilient Spacers for Conforming Object Interaction," which is incorporated by reference herein in its entirety.

BACKGROUND

Robotic hands or grippers typically grasp objects resulting in point or line contact and associated loads that can be awkward or less effective. Point or line contact and loads is/are particularly a result of the rigid surfaces making up the robotic hands or grippers, such as the finger(s), palms or other elements of the robotic hand or gripper. Such rigid surfaces also do not permit conforming of the robotic hand or gripper along its surfaces to the object being grasped. Stated differently, the rigid surfaces making up the robotic hand are not able to conform to the object being grasped. The development of robotic hands or grippers is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1a is a front view of a robotic end-effector, namely a semi-anthropomorphic hand, with jamming conformal pads in accordance with an example.

FIG. 1B is a side view of the robotic end-effector of FIG. 1a shown gripping an object.

FIG. 2b is a schematic cross-sectional side view of the jamming conformal pad of FIG. 1a shown in a non-contacting, compliant configuration with the object.

FIG. 3b is a schematic cross-sectional side view of the jamming conformal pad of FIG. 1a shown in a contacting, stiff configuration with the object removed.

FIG. 12b is a side view of the end effector of FIG. 12a.

FIG. 13 is a front view of another end-effector, namely a plate or anthropomorphic hand, with jamming conformal pads in accordance with an example.

FIG. 14a is a front view of another end-effector, namely a plate or anthropomorphic hand, with jamming conformal pads in accordance with an example.

FIG. 14b is a side view of the end effector of FIG. 14a.

Figure 2A:
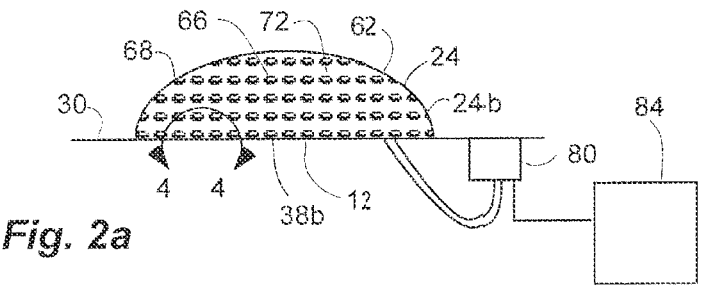
FIG. 2a is a schematic cross-sectional side view of the jamming conformal pad of FIG. 1a shown in a non-contacting, compliant configuration.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Disclosed herein is a robotic end-effector configured to provide conformal object interaction. The robotic end effector can comprise one or more fingers each having an inner portion and each operable in one or more degrees of freedom, and one or more jamming conformal pads. Each jamming conformal pad can be disposed on the inner portion of a corresponding finger of the one or more fingers. Each jamming conformal pad can comprise an exterior membrane conformable to a surface of an object, and a filler disposed between the membrane and the inner portion of the at least one finger. The filler can comprise a plurality of elongate resilient spacers and a plurality of jamming particles. In one example, each of the one or more jamming conformal pads can be operable in at least one of two pad configurations. The first configuration can be a compliant configuration in which a shape of the jamming conformal pad is changeable to achieve an engaged shape upon engagement of the pad with the surface of the object. A second configuration can be a stiff configuration in which the jamming conformal pad maintains the engaged shape, and is relatively stiff compared to the jamming conformal pad in the compliant configuration. Additional configurations between the compliant and the stiff configurations can be achieved by varying the pressure within the jamming conformal pad, such as by providing a variable pressure source or varying pressure via one or more valves operable with the pressure source.

Also disclosed herein is a robotic end-effector comprising a pair of members being movable with respect to one another; a bladder on at least one of the members; and a filler within the bladder. The filler can comprise a plurality of jamming particles and a plurality of elongate resilient spacers. The plurality of jamming particles can be operable to flow within the bladder. Flow characteristics of the plurality of jamming particles about the plurality of elongate resilient spacers can vary with pressure within the bladder. Compliance of the bladder can vary with the flow characteristics of the jamming particles. In one example, the bladder with the filler therein can be placed in one of two configurations: a compliant configuration in which a shape of the bladder and filler are changeable, and a stiff configuration in which change in the shape of the bladder and filler is resisted, and in which the bladder and filler are stiff as compared to the bladder and filler in the compliant configuration. Again, additional configurations between the compliant and the stiff configurations can be achieved by varying the pressure within the jamming conformal pad, such as by providing a variable pressure source or varying pressure via one or more valves operable with the pressure source.

Also disclosed herein is a stiffening element device configured to provide variable resistance. The stiffening element device can comprise a joint with a pair of movable members being movable with respect to one another about the joint, a bladder coupled to the pair of movable members, and a filler within the bladder. The filler can comprise jamming particles and elongate resilient spacers. The jamming particles can be flowable and the elongate resilient spacers can be deformable in the bladder. Flow characteristics of the jamming particles about the elongate resilient spacers can vary with pressure within the bladder. Resistance to movement of the pair of movable members can vary with the flow characteristics of the jamming particles about the elongate resilient spacers.

FIGS. 1a-5 depict an example robotic end-effector 8, namely a semi-anthropomorphic hand with three-fingers 12 and an opposable thumb 16 extending from a palm 20. FIG. 1a depicts the end-effector 8 open or empty, and with one or more jamming conformal areas or pads, indicated collectively at 24; while FIG. 1b depicts the end-effector 8 closed or grasping a workpiece or object 26. The fingers 12, the thumb 16 and the palm 20 of the end-effector 8 can have an inner portion 30 (which can also be referred to as an engaging side or surface) that faces inwardly and that engages directly or indirectly (i.e., indirectly due to the presence of a bladder and associated exterior membrane that at least partially covers the inner portion or engaging side or surface 30) with the workpiece or object 26. In addition, the fingers 12 and the thumb 16 can be opposable and can oppose one another across a gap 34 that receives the workpiece or object 26. In one aspect, the thumb 16 can also be characterized as a finger 12 so that the end-effector 8 can have at least two opposing fingers 12 and 16. In another aspect, the end-effector 8 can have at least one finger 12 that can oppose another structure, such as the palm 20, so that the finger 12 can oppose and close against the palm 20.

Furthermore, the fingers 12 and the thumb 16 can be articulated and can have one or more degrees of freedom. For example, the fingers 12 and/or the thumb 16 can pivot with respect to the palm 20 or a base. In one aspect, each of the fingers 12 and the thumb 16 can have a series of segments, indicated collectively at 38, with adjacent segments movably coupled together at a joint, indicated collectively at 42. The fingers 12 and the thumb 16 can each have at least a proximal segment 38a coupled to the palm 20 and a distal free segment 38b. In addition, each finger 16 and thumb 16 can have an intermediate segment 38c intermediate the proximal and distal free segments 38a and 38b. Thus, each finger 12 and thumb 16 can have three segments 38. The fingers 12 and the thumb 16 are movable with respect to one another and with respect to the palm 20. Thus, the fingers 12 and the thumb 16 can mover to vary the size of the gap 34. In one aspect, the fingers 12 and the thumb 16 can collapse on the gap 34 in order to grip the workpiece or object 26. In addition, the segments 38 of each finger 12 and thumb 16 can move with respect to an adjacent segment 38, or the palm 20, to grip the workpiece or object 26. The fingers 12 and the thumb 16, and the segments 38 thereof, can be operatively coupled to actuators and a controller to effect movement. Furthermore, the end-effector 8, and the fingers 12 and the thumb 16, and the segments 38 thereof, can be rigid members.

The end-effector 8, and the fingers 12, the thumb 16 and/or the palm 20, can have one or more jamming conformal areas or pads 24. The jamming conformal areas or pads 24 can be disposed on an inner portion 30 (e.g., the engaging sides) of the fingers 12, the thumb 16 and/or the palm 20, and carried or supported by the end-effector 8. Thus, the jamming conformal areas or pads 24 can be positioned to contact and engage the workpiece or object 26, and can be disposed between the workpiece or object 26, and the fingers 12, thumb 16 and palm 20. In one aspect, the fingers 12, the thumb 16 and/or the palm 20 can be separated from the workpiece or object 26 by the jamming conformal areas or pads 24.

In one aspect, a separate and distinct jamming conformal area or pad 24 can be disposed on each component, or finger 12, thumb 16 and palm 20, of the end-effector 8. For example, a palm pad 46 can be disposed on the palm 20, a thumb pad 48 can be disposed on the thumb 16, and finger pads 50 can be disposed on the fingers 12. In another aspect, separate and discrete jamming conformal areas or pads 24 can be disposed on each segment 38 of the finger 13 and the thumb 16. For example, a proximal pad 24a can be disposed on the proximal segment 38a, an intermediate pad 24c can be disposed on the intermediate segment 38c, and a distal pad 24b can be disposed on the distal free segment 38a. In another aspect, separate and discrete jamming conformal areas or pads 46 can be disposed on the palm 20. In another aspect, the end-effector 8 can have only certain jamming conformal areas or pads 24. For example, the end-effector 8 may only have distal or fingertip pads 24b on the distal free ends of the fingers 12 and the thumb 16. As another example, the end-effector 8 may have distal pads 24b on the distal free ends of the fingers 12 and the thumb 16, and the palm pad 46 on the palm 20. The separate and discrete jamming conformal areas or pads 24 can form different zones.

Figure 3A:
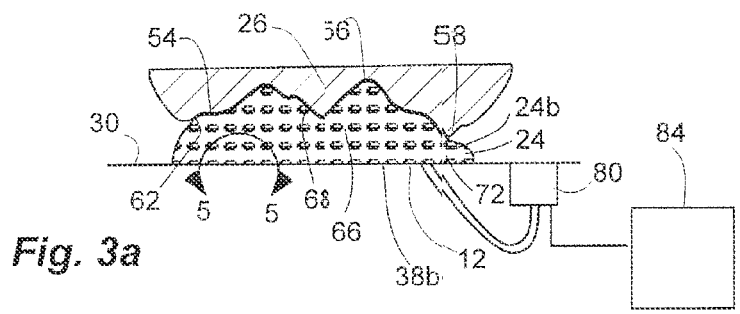
FIG. 3a is a schematic cross-sectional side view of the jamming conformal pad of FIG. 1a shown in a contacting, stiff configuration with the object.

FIG. 2a depicts a jamming conformal area or pad 24 in a compliant configuration, while FIG. 3a depicts the jamming conformal area or pad 24 in a stiff configuration and in contact or engagement with the workpiece or object 26. Similarly, FIG. 2b depicts the jamming conformal area or pad 24 in the compliant configuration prior to contact or engagement with the workpiece or object 26, while FIG. 3b depicts the jamming conformal area or pad 24 in the stiff configuration absent the workpiece or object 26, of after releasing the workpiece or object 26. In FIGS. 2a-3b, the jamming conformal area or pad 24 is represented by the distal pad 24b, while the segments 38 of the fingers 12, thumb 16 and palm 20 are represented by the distal free segment 38b. The workpiece or object 26 can have a surface 54. In one aspect, the surface 54 can comprise a contoured surface with indentations 56 and/or protrusions 58. In one aspect, the surface 54 of the workpiece or object 26 can be irregular and/or asymmetric. In another aspect, the surface 54 of the workpiece or object 26 can be regular and/or symmetric, but can have a discontinuous surface configuration with the indentations 56 and/or protrusions 58. The jamming conformal area or pad 24 or 24b can be compliant to distribute across the surface 54 of the workpiece or object 26. In the event the surface 54 is contoured with one or more variations (indentations 56 and protrusions 58) from flat, the jamming conformal area or pad 24 or 24b can distribute across the surface 54 and infiltrate into the indentations 56 in the surface 54 (similar to how the fingers and palm of a human hand conform at least to some degree). The resulting contour or shape of the jamming conformal area or pad 24 or 24b can define a conformal engaging surface 62 (FIG. 3b) that is operable to match and mate with the surface 54 of the workpiece or object 26. In the compliant configuration, the jamming conformal area or pad 24 or 24b can be compliant, conformal, flexible and susceptible to manipulation or movement or modification in which a shape of the jamming conformal pad is changeable in response to engagement of the jamming conformal area or pad with the surface of an object. The shape of the jamming conformal pad can be changed to achieve a plurality of different engaged shapes depending upon the object or objects to be grasped. In one aspect, the jamming conformal area or pad 24 or 24b can be free, relaxed and/or un-energized in the compliant configuration in order to allow the jamming conformal area or pad to be caused to at least partially, and in some cases fully, conform to a surface of an object. This is advantageous over prior end effectors that just rely on point or line contact and associated loads because by at least partially conforming to a surface of an object, the jamming conformal areas or pads can achieve area contact (contact about an area of an object rather than just a point or line), and can exert and facilitate multi-directional distributed forces within the area contact, as well as area wide opposing forces between the surface and the end-effector 8, with its associated fingers 12, thumb 16 and/or palm 20. These all function to increase the static and kinetic coefficient of friction between the object and the end effector 8, and these functions are similar to that those that occur between the human hand and the surface of a grasped object.

In one aspect, the jamming conformal area or pad 24 or 24b can be active or dynamic, or can be or can comprise and an active or dynamic pad or surface, and can be capable of changing character, state and/or responsiveness, such as compliant characteristics between compliant and stiff. Thus, the jamming conformal area or pad 24 and 24b can selectively alternate between configurations or states, such as compliant and stiff configurations, as well as achieve states in between these. In addition, the jamming conformal area or pad 24 or 24b can alternately change and maintain the a shape, such as an engaged shape (due to interaction with an object) or a shape achieved without engaging an object. In the event the end effector 8 is used to grasp an object, the resulting engaged shape and contour of the conformal engaging surface 62 can be maintained with the jamming conformal area or pad in the stiff configuration. In the stiff configuration, the jamming conformal area or pad 24 or 24b is stiff or relatively stiff compared to the compliant configuration. In addition, in the stiff configuration, the jamming conformal area or pad 24 or 24b can substantially maintain any engaged shape and contour of the jamming conformal area or pad 24 or 24b and its corresponding conformal engaging surface 62. Thus, in the stiff configuration, the jamming conformal area or pad 24 or 24b, and/or the conformal engaging surface 62, becomes substantially rigid or solid. In one aspect, the shape or contour of the conformal engaging surface 62 and the jamming conformal area or pad 24 or 24b are controllable and active, as opposed to being passive. In the stiff configuration, the conformal engaging surface 62 has substantially the same shape and/or contour as the surface 54 (be it contoured, flat, or a combination of these) of the workpiece or object 26, even if the workpiece or object 26 is removed, as shown in FIG. 3b. In the stiff configuration, the jamming conformal area or pad 24 or 24b can be energized, and is capable of actively maintaining the shape and/or contour of the conformal engaging surface 62. Thus, the jamming conformal area or pad 24 or 24b, and the conformal engaging surface 62, can be adaptive to the surface 54 of the workpiece or object 26, and can distribute forces over an area, and can extend into indentations 56 for a better grip, which are just some of the advantages provided. This can result in less slippage between the end effector 8 and the object, and can further facilitate a reduction in the amount of forces needed in the end effector 8 to both grasp and hold an object, particularly as compared with prior end effectors having only rigid gripping, palm or other surfaces intended to interact with objects that rely on point or line contact and associated loads.

In one aspect, the jamming conformal area or pad 24 or 24b can be binary, and can have only the two compliant and stiff configurations. In another aspect, the jamming conformal area 24 or 24b can be analog, and can have multiple varying degrees of stiffness between the compliant and stiff configurations, as described in greater detail below.

In one aspect, the jamming conformal areas or pads 24 can be operated collectively. Thus, each jamming conformal area or pad 24 can share a common state or configuration, such as all being compliant or all being stiff. Similarly, all may share a similar degree of stiffness or compliance. In another aspect, the jamming conformal areas or pads 24 can be operated independently with respect to one another. Thus, one jamming conformal area or pad 24 may be compliant while another jamming conformal area or pad 24 may be stiff. In addition, different jamming conformal areas or pads 24 may have different degrees of compliance or stiffness.

Although the jamming conformal area or pad 24 or 24b has been described above as being relaxed in the compliant configuration and energized or active in the stiff configuration, the jamming conformal area or pad 24 or 24b can be configured to be relaxed or un-energized in the stiff configuration, and energized in the compliant configuration.

In one aspect, the jamming conformal area or pad 24 or 24b comprises a bladder 66 on the inner portion 30 of the finger 12, thumb 16 or palm 20. The bladder 66 can have an exterior membrane 68 conformable to the surface 54 of the workpiece or object 26, and forming the conformal engaging surface 62. The bladder 66 can contain a filler 72 disposed in and flowable in the bladder 66. Thus, the filler 72 is behind the membrane 68 and between the membrane 68 and the inner portion 30 of the finger 12, thumb 16 or palm 20, or in other words in contained within the membrane 68. In another aspect, the filler 72 can comprise particles 76. The filler 72 can have at least two configurations, including a flowable configuration, as shown in FIGS. 2a and 2b, and a static configuration, as shown in FIGS. 3a and 3b. The flowable configuration corresponds to the compliant configuration of the jamming conformal area or pad 24. In the flowable configuration, the filler 72 flows as the exterior membrane 68 and bladder 66 conform to the surface 54. The static configuration corresponds to the stiff configuration of the jamming conformal area or pad 24. In the static configuration, the filler 72 is static or relatively static with respect to the flowable configuration, and resists flow of the filler 72. In another aspect, a flow characteristic of the filler 72 varies with pressure within the bladder 66. Thus, compliance of the bladder 66, and the membrane 68 and the conformal engaging surface 62, varies with the flow characteristics of the filler 72. In other words, compliance of the bladder 66 can vary with the ability of the filler 72 to flow within the bladder, such as whether the filler 72 can flow freely within the bladder 66 or whether flow of the filler 72 within the bladder is constricted.

The bladder 66 can be flexible and resilient, or elastic, and can be formed of any flexible and resilient, or elastic, material suitable for the purposes and functions described herein, and as will be recognized by those skilled in the art. For example, and not intending to be limiting in any way, the bladder 66 can be formed of elastomers, such as natural rubber, silicone, neoprene, nitrile, butyl, and others; flexible/stretchy polymers, such as polyethylene, polypropylene, vinyl, and others. Thus, the bladder 66 can be formed of a material that facilitates, and can comprise, a volume that is changeable. For instance, the bladder 66 can be configured to collapse a given degree under a corresponding given pressure, and can have a volume that is changeable. In addition, the bladder 66 can be configured to change shape and position as the bladder 66 or membrane 68 contacts the surface 54 of the workpiece or object 26. In one aspect, the bladder 66 can be formed of a single material, a laminate, or a reinforced material. The bladder 6 can be sealed with respect to the surrounding environment, and can be hermetically sealed. The bladder 66 can have an interior or hollow, and can define a pocket. In one aspect, the bladder 66 can be formed of a pair of layers sealed around a perimeter. An inner layer can be substantially and/or relatively flat, while an exterior layer can be substantially and/or relatively convex to create the hollow. The inner layer of the bladder 66 can be coupled or otherwise secured to the finger 12, thumb 16 and/or palm 20 of the end-effector 8. An inner surface of the inner layer can be coupled or otherwise secured to the end-effector 8 such that a majority, or substantially all, of the inner surface is coupled or secured to the end-effector 8, or the inner portion 30 thereof. In another aspect, a perimeter of the inner layer can extend beyond the seal to form a flange or tabs that can be coupled or otherwise secured to the end-effector 8. The bladder 6 can be attached or coupled or otherwise secured to the finger 12, thumb 16 and/or palm 20 using adhesives, fasteners and seals, and any other means or methods of attachment. The bladder can be attached or otherwise supported by the end effector via being molded and adhered to the surface, or it can form the outer wall, with the gripper surface being the other side, and in which case the bladder can have its free edge clamped in such a way as to seal it and create a sealed volume.

A filler 72 can be disposed in the bladder 66, and can be flowable or otherwise movable in the bladder 66. By flowable, it is meant that the particles 76 can move relative to one another. In one example, the filler 72 can comprise particles 76 that can flow and move with respect to one another, and that can bear against one another. In one aspect, the particles 76 can substantially fill the bladder 66 in a loose manner, and can occupy a majority of the hollow of the bladder 66 or volume thereof. The filler 72 flows, and the particles 76 move with respect to one another, within the bladder 66 as the bladder and the hollow or interior volume changes shape and position due to contact or engagement of the bladder 66 with the surface 54 of the workpiece of object 26, and any contours or variations within the surface 54. In one aspect, the filler 72 can further comprise a gas, such as air, filling interstices between the particles 76. Essentially, the filler 72 can be contained within and caused to be flowable in the bladder 66, the filler 72 comprising particles 76, wherein a flow characteristic of the filler 72 varies with pressure within the bladder 66, and resistance to movement of the bladder 66, the membrane 68 and the conformal engaging surface 62, varies with the flow characteristics of the filler 72. In addition, the stiffness of the bladder 66 or membrane 68 can be characterized as being the increase in interaction forces between the particles 76 of the filler 72.

Furthermore, a pressure source 80 can be operatively coupled to the bladder 66 (e.g., operable to induce a pressure within or about the bladder 66), and capable of varying a pressure within the bladder 66. In one aspect, the pressure source 70 can comprise a vacuum source configured to selectively withdraw an interstitial material or fluid, such as gas or air, from the bladder 66. For example, the vacuum source can be a vacuum pump, such as a piston moveable within a cylinder. As the pressure changes within the bladder 66, the bladder 66 collapses, thus causing the flow characteristics of the filler material 72 and the particles 76 to vary. By collapse it is meant that the bladder 66 collapses or reduces in volume at least some degree from its fully expanded state or condition. As the bladder 66 changes volume, the contact and/or interference between the particles 76 of the filler 72 is increased. As the flow characteristics of the filler 72 and particles 76 vary, a compliance of the bladder 66, with the filler 72 therein, reduces and thus the compliance of the bladder 66, the membrane 68 and the conformal engaging surface 62, varies. Thus, the pressure source 80 or vacuum source can be selectively varied to selectively vary the stiffness or compliance of the bladder 66. In one aspect, the stiffness or compliance of the jamming conformal areas or pads 24 and the bladder 66 can be selectively varied through a continuous range of resistance between compliant and rigid. The stiffness or compliance can be adjusted dynamically to be essentially soft or fluid all the way to completely stiff or rigid, and any state in between. The pressure source 80 is capable of providing a variable degree/range of pressure within the bladder 66 to provide a variable degree/range of stiffness or compliance of the bladder 66 with the filler 72. The pressure source 80 is capable of varying pressure within the bladder 66 to provide compliance facilitating free movement of the membrane 68 or conformal engaging surface 62, and stiffness or limited movement of the membrane 68 or conformal engaging surface 62. In another aspect, and although not shown, one skilled in the art will recognize that rather than varying the pressure source 80, the pressure source 80 can be operable with one or more valves in fluid communication with the pressure source 80 and the bladder 66, where the valves are controllable to vary the pressure within the bladder 66.

Figure 4:
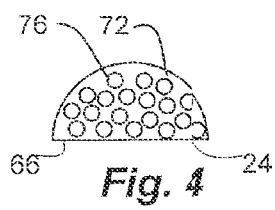
FIG. 4 is a detailed schematic side view of the jamming conformal pad of FIG. 1a taken along line 4 of FIG. 2a, showing particles of a filler in a flowable configuration.
Figure 5:
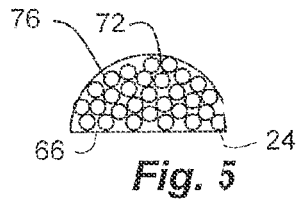
FIG. 5 is a detailed schematic side view of the jamming conformal pad of FIG. 1a taken along line 5 of FIG. 3a, showing particles of the filler in a static configuration.

FIG. 4 depicts a detailed schematic side view of the bladder 66 or jamming conformal area or pad 24 taken along line 4 of FIG. 2a, while FIG. 5 is a detailed schematic side view of the bladder 66 or jamming conformal area or pad 24 taken along line 5 of FIG. 3a. FIG. 4 depicts the particles 76 of the filler 72 in the relaxed, flowable or conformal configuration of the bladder 66 or pad 24 corresponding to a relatively larger pressure, such as ambient pressure, within the bladder 66. The particles 76 can flow and move relative to one another, and while in contact one another, are not brought to bear against one another with any significant frictional force. Thus, the bladder 66 or conformal engaging surface can be relatively free to move with respect to the workpiece or object, and experience very little or nominal resistance from the bladder 66. On the other hand, FIG. 5 depicts the particles 76 of the filler 72 in the static or stiff configuration of the bladder 66 or pad 24 corresponding to a relatively lower pressure, with respect to the larger pressure or ambient pressure. In this case, the bladder 66 has been caused to collapse on the filler 72, and thus the particles 76 are brought to bear against one another, and interfere with one another to restrict flow. Thus, the bladder 66 or conformal engaging surface can have relatively restricted movement, and can experience relatively larger resistance from the bladder 66. The particles 76 can be relatively loose under greater pressure, as shown in FIG. 4, and can flow easily with respect to one another; but the particles 76 can be relatively compacted under less pressure, as shown in FIG. 5, and can have difficulty flowing with respect to one another. Compacting the particles 76 can result in greater physical impediment to flow, and greater friction between the particles. As the pressure source 80 or vacuum reduces pressure within the bladder 66, the bladder 6 collapses and compacts the particles 76 of the filler 72, thus impeding the flow of the particles 76 and stiffening the jamming conformal area or pad 24. Essentially, with reduced pressure, the particles 76 are forced together, thus increasing the kinetic coefficient of friction between them. The magnitude of the kinetic coefficient of friction can be varied by varying the pressure induced by the collapse of the bladder 66 and the resulting compaction of the particles 76.

Referring again to FIGS. 2a and 3a, the end-effector can further comprise one or more sensors and a controller 84. The sensors can sense a characteristic of the jamming conformal area or pad 24, or the bladder 66, such as pressure in the bladder 66. In one example, a pressure sensor can be operatively coupled to the bladder 66, such as the bladder itself, the pressure source 80, or a pressure line between the bladder and the pressure source.

The pressure sensor can be capable of providing feedback to the pressure source 80 and/or the controller 84. Thus, the stiffness can be varied based on a pressure of the bladder 66. The controller 84 can be operatively coupled to the pressure source 80 (or alternatively one or more valves) to control the pressure source to selectively vary the pressure within the bladder 66. In another aspect, a force sensor can be used. In another aspect, pressure force and position sensors can be used. In another aspect, the controller 84 and the pressure source 80 can be used to vary the pressure within multiple bladders (e.g., via a bus arrangement in which a plurality of pressure lines (or branches of pressure lines) between the pressure source and the plurality of bladders are used).

Figure 6:
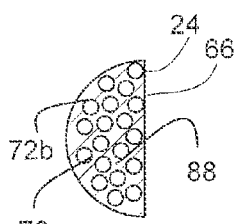
FIG. 6 is a detailed schematic side view of a filler of a jamming conformal pad in one example, showing an interstitial material, namely a liquid, in interstices between the particles.

FIG. 6 depicts a detailed schematic side view of filler 72b of a jamming conformal area or pad 24, or bladder 66, showing an interstitial material 88 in interstices between the particles 76. In one aspect, the interstitial material 88 can comprise a liquid, such as oil to facilitate flow of the particles 76. In one aspect, the interstitial material 88 can be non-compressible. In one aspect, the interstitial material 88 can fill the interstices between the particles 76, and can substantially fill the bladder 66. In another aspect, the interstitial material 88 can substantially coat the particles 76, defining coated particles, while of majority of the interstices between the particles 76 remains a gas. Thus, the interstitial material 88 can comprise a fluid, such as a liquid or a gas.

Figure 7:
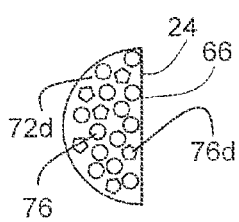
FIG. 7 is a detailed schematic side view of a filler of a jamming conformal pad in one example, showing particles having different sizes.

FIG. 7 depicts a detailed schematic side view of filler 72c of a jamming conformal area or pad 24, or bladder 66, showing particles having different sizes. The particles 76 and 76c of the filler 72c can comprises at least two different sizes of particles, and in some examples three, four or more different sizes. In one aspect, smaller particles 76*c* can be disposed in the interstices between the larger particles 76. In one aspect, the particles 76 and 76*c* can be formed of different materials, and can have different characteristics, such as different coefficients of friction, different compressibility, etc. Those skilled in the art will recognize that the size, configuration, material makeup or type, etc. and relative quantities of the particles 76 and 76*c* can be selected to obtain desired flow characteristics, and to tune the resistance characteristics of the jamming conformal area or pad 24, or bladder 66. Indeed, it is contemplated that the jamming conformal area or pad 24, or bladder 66, discussed herein can be tuned as needed or desired.

Figure 8:
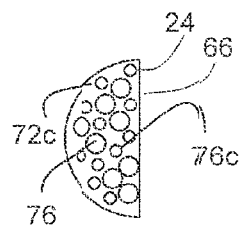
FIG. 8 is a detailed schematic side view of a filler of a jamming conformal pad in one example, showing particles having different shapes.

FIG. 8 depicts a detailed schematic side view of filler 72*d* of a jamming conformal area or pad 34, or bladder 66, showing particles 76 and 76*d* having different shapes. The particles of the filler 72*d* can comprise at least two different shapes of particles, and in some examples three, four or more different shapes or configurations. In one aspect, some of the particles 76 can be spherical, semi-spherical, or partially spherical (meaning substantially spherical while not a perfect sphere) while other particles 76*d* can have flat surfaces. In another example, the shapes or configuration of the particles 76*d* can be random. The particles 76 and 76*d* can have different characteristics due to their respective shapes that can change the flow characteristics. The shapes of the particles 76 and 76*d* can be selected to obtain desired flow characteristics, and to tune the resistance characteristics of the jamming conformal area or pad 24, or bladder 66.

Figure 9:
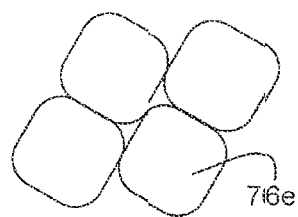
FIG. 9 is a detailed schematic side view of a filler of a jamming conformal pad in one example, showing a compressibility of the particles.

FIG. 9 depicts a detailed schematic side view of particles of a filler of a jamming conformal area or pad, or bladder, showing a compressibility of the particles 76*e*. In one aspect, the particles 76*e* of the filler can be elastically compressible, as shown. In another aspect, the particles can be relatively rigid. The particles 76*e* of the filler can have an elastic modulus, which is a measure of elastic deformation in response to an applied load, and/or a yield strength, which is the onset of plastic deformation at a given stress level. In one aspect, the particles can comprise rubber, which essentially does not have a yield strength, but rather elastically deforms until it fractures. In one aspect, the particles of the filler can have a relatively low modulus (Young's Modulus of Elasticity), such as 0.01-3.5 GPa, and can comprise a polymer, such as rubber (Young's Modulus of 0.01-0.1 GPa or $1.45$-$14.5 \times 10^{-3}$ Mpsi), Acrylonitrile Butadiene Styrene (ABS) (Young's Modulus of 1.4-1.3 GPa or 2.3 GPa), nylon (Young's Modulus of 2-4 GPa or 0.29-0.58 Mpsi; yield strength of 45 MPa), low-density polyethylene (Young's Modulus of 0.11-0.86 GPa or $1.6$-$6.5 \times 10^{-3}$ Mpsi), high-density polyethylene (Young's Modulus of 0.8 GPa or 0.116 Mpsi), polypropylene (Young's Modulus of 1.5-2 GPa or 0.22-0.29 Mpsi), polyimide (Young's Modulus of 2.5 GPa), polystyrene (Young's Modulus of 3-3.5 GPa or 0.44-0.51 Mpsi), etc. In another aspect, the particles of the filler can have a relatively high modulus, such as 50-100 GPa, and can comprise sand (7-80 MPa), aluminum (Young's Modulus of 69 GPa or 10 Mpsi; yield strength of 95 MPa), glass (Young's Modulus of 50-90 GPa or 7.25-13.1 Mpsi), etc. In one aspect, the particle of the filler can be light-weight materials to facilitate mobility. In another aspect, the moduli of the material can be selected based on material properties temperature ranges of interest. In another aspect, the particles of the filler can have at least two different moduli.

Figure 10:
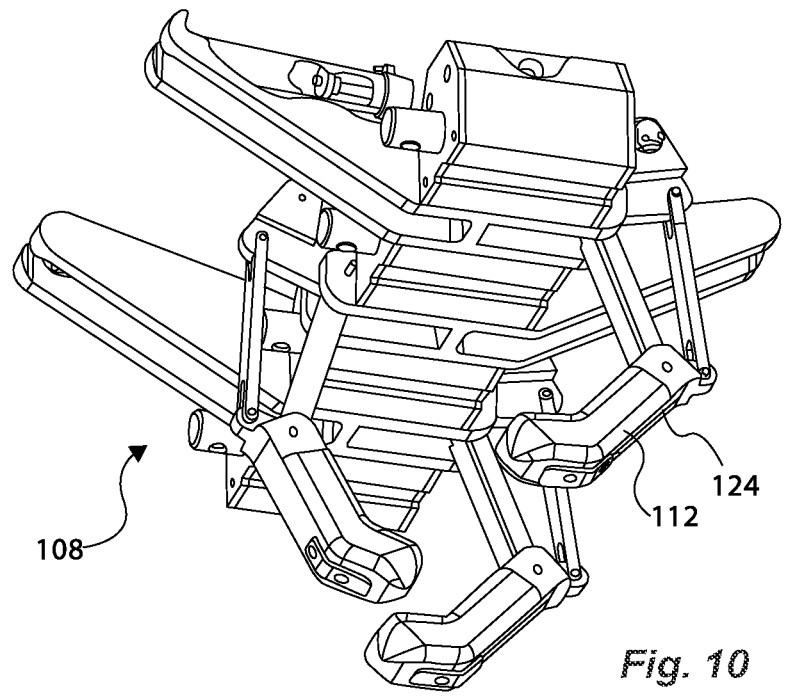
FIG. 10 is a perspective view of another end-effector, namely a hybrid magnetic and finger gripper, with jamming conformal pads in accordance with an example.

FIG. 10 depicts another example of an end-effector 108, namely a hybrid magnetic and finger gripper, with jamming conformal areas or pads 124, or bladders, which is similar in most respects to that described above, and which description is hereby incorporated herein where applicable, as will be recognized by those skilled in the art. The end-effector 108 can have opposing fingers 112 that can have an obtuse angle between adjacent or contiguous segments. Thus, corresponding jamming conformal areas or pads 124 can match the obtuse angle of the fingers 112. The jamming conformal areas or pads 124 can have a substantially constant thickness from the fingers 112 outwardly along the segments, and even while spanning the apex between the segments. In another aspect, different and/or multiple jamming conformal areas or pads can be disposed on each linear segment of the fingers.

Figure 11:
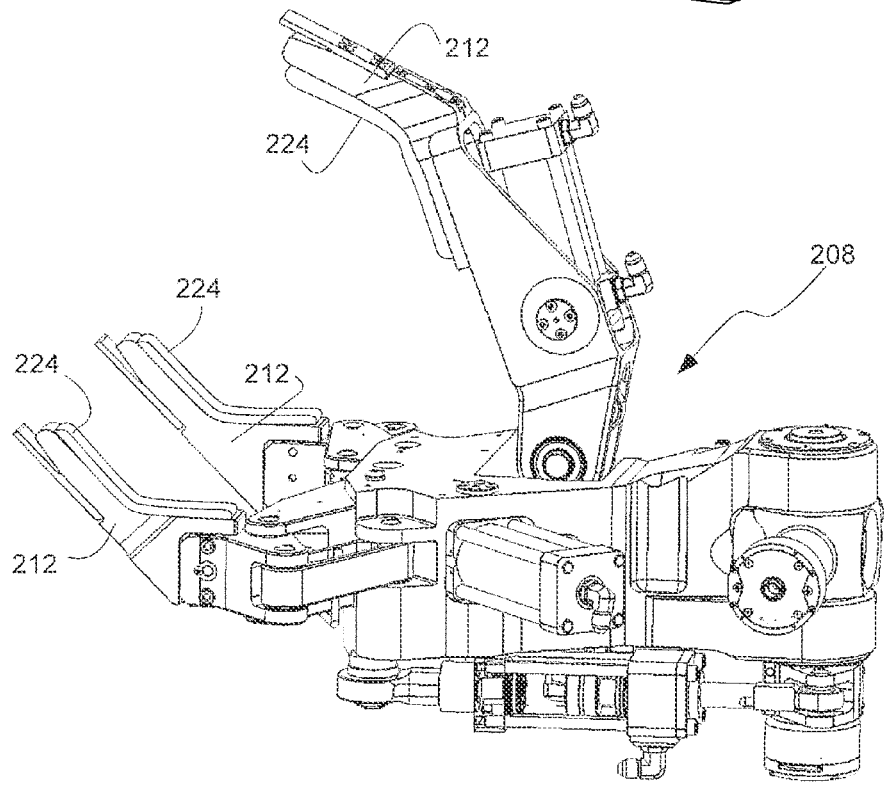
FIG. 11 is a perspective view of another end-effector, namely a morph hand, with jamming conformal pads in accordance with an example.

FIG. 11 depicts another example of an end-effector 208, namely a morph hand, with jamming conformal areas or pads 224, or bladders, which is similar in most respects to those described above, and which descriptions are hereby incorporated herein where applicable, as will be recognized by those skilled in the art. The end-effector 208 can have opposing fingers 212 that can have an obtuse angle between adjacent or contiguous segments. Thus, corresponding jamming conformal areas or pads 224 can match the obtuse angle of the fingers 212. The fingers 212, and thus the jamming conformal areas or pads 224, can be long and slender, such as a length along the finger much greater than a width of the finger. In another aspect, different and/or multiple jamming conformal areas or pads can be disposed on each segment of the fingers.

Figure 12A:
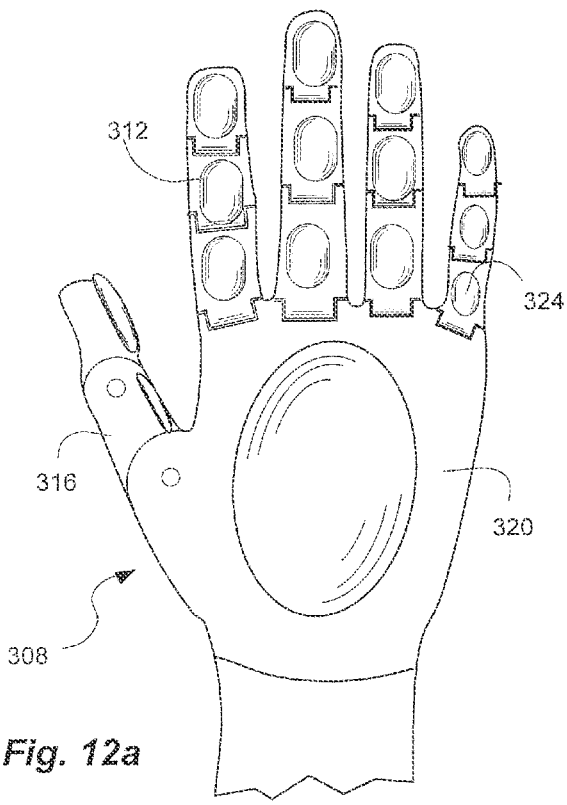
FIG. 12a is a front view of another end-effector, namely a plate or anthropomorphic hand, with jamming conformal pads in accordance with an example.
Figure 12B:
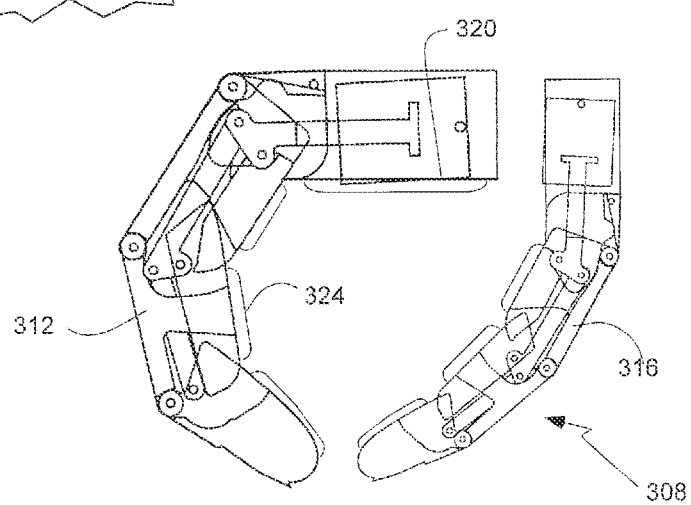

FIGS. 12*a* and 12*b* depict another example of an end-effector 308, namely a plate or anthropomorphic hand, with jamming conformal areas or pads 324, or bladders, which is similar in most respects to those described above, and which descriptions are hereby incorporated herein where applicable, as will be recognized by those skilled in the art. The end-effector 308 can have four fingers 312, an opposable thumb 316 and a palm 320. In one aspect, separate and discrete jamming conformal areas or pads 324 can be disposed on each segment of the finger 312 and the thumb 315 and the palm 320.

FIG. 13 depicts another example of an end-effector 408, namely a plate or anthropomorphic hand, with jamming conformal areas or pads 424, or bladders, which is similar in most respects to those described above, and which descriptions are hereby incorporated herein where applicable, as will be recognized by those skilled in the art. The end-effector can have four fingers 312, an opposable thumb 316 and a palm 320. In one aspect, a separate and distinct jamming conformal area or pad 424 can be disposed on each component, or finger 312 and thumb 316, and the palm 320 of the end-effector. For example, a palm pad 446 can be disposed on the palm 320, a thumb pad 448 can be disposed on the thumb 316, and finger pads 424 can be disposed on the fingers 312. Thus, the jamming conformal area or pad 424 can be a single jamming conformal area or pad disposed on the articulated finger 312 and spanning the series of segments and intermediate joints.

FIGS. 14*a* and 14*b* depict another example of an end-effector 508, namely a plate or anthropomorphic hand, with a jamming conformal area or pad 524, or bladder, which is similar in most respects to those described above, and which descriptions are hereby incorporated herein where applicable, as will be recognized by those skilled in the art. The end-effector 508 can have four fingers 312, an opposable thumb 316 and a palm 320. In one aspect, a single jamming conformal area or pad 524 can be disposed on the end-effector 508, and can extend along each segment of the finger 312 and the thumb 316, and between the palm 320 and the fingers 312 and thumb 316. Thus, the jamming conformal area is a single jamming conformal area or pad 524 spanning the palm 320, the four fingers 312 and the thumb 316.

FIGS. 15A-21B illustrate additional examples of jamming conformal pads operable with a robot and/or a robot end-effector as taught herein. The jamming conformal pads are similar to those discussed above in many respects, and can comprise similar configurations, properties, functions, etc. However, unlike those discussed above, the jamming conformal pads shown in FIGS. 15A-21B comprise one or more elongate resilient spacers supported or disposed and operable within the interior volume of the bladder of the jamming conformal pad (or stiffening element). As such, the discussion above with respect to FIGS. 1A-14B is applicable here, and can be referred to for an understanding of the jamming conformal pads/stiffening elements shown in FIGS. 15A-21B and how these can be configured, their purpose and function, and their operability with a robot or robotic end-effector and/or a joint of a robotic joint. Moreover, those skilled in the art will understand that any of the jamming conformal pads discussed above can be modified in accordance with the teachings herein to comprise one or more elongate resilient spacers.

The term "resilient spacer" as referred to herein, shall be understood to mean a structure formed from one or more materials possessing a property of elasticity (a modulus of elasticity), that is/are elastically deformable, and that enables the resilient spacer to undergo elastic deformation in response to an applied load, wherein the resilient spacer returns or partially returns to its original size and shape upon removal or partial removal of the applied load. The materials selected can exhibit linear or nonlinear properties of elasticity. Example materials include, but are not limited to elastomers, natural rubbers, synthetic rubbers, or combinations of these. In some examples, the resilient spacers can be self-supporting, meaning that they are sized, shaped and configured to be able to stand and not collapse under the influence of gravity and under natural ambient environment conditions. In some example, the resilient spacers can be configured to be collapsible under the influence of gravity and under natural ambient environment conditions.

Figure 15A:
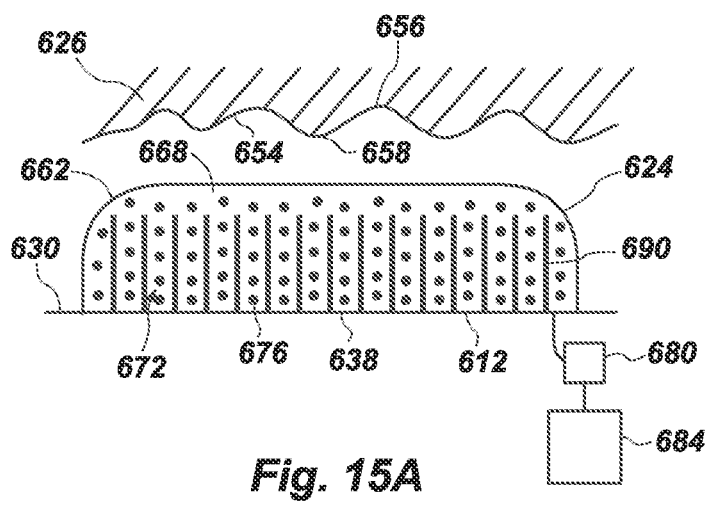
FIG. 15A is a schematic cross-sectional side view of a jamming conformal pad shown in a non-contacting, compliant configuration in accordance with an example, with the jamming conformal pad comprising elongate resilient spacers anchored and extending upward from a lower surface.

FIG. 15A is a schematic cross-sectional side view of an example jamming conformal pad 624 shown in a non-contacting, compliant configuration. In this example, the jamming conformal pad 624 can be part of a robot or robotic device, such as a robotic end-effector, or other type of structure or system, and supported on a segment 638 of a finger 612 of the robotic end-effector. The finger 612 can be similar to any of the fingers described above, and can be incorporated on a robot end-effector, such as those described herein. While the jamming conformal pad 624 is described as being on a finger 612 of a robot-end-effector, the jamming conformal pad 624 is not limited to being supported on a finger. The jamming conformal pad 624 can be incorporated on (attached to or integrally formed with) a thumb, a palm, or any other portion or combination of portions of a robotic end-effector, such as any portion or portions of the robotic end-effector that interface(s) with an object or other surface.

The jamming conformal pad 624 can be attached to an inner portion 630 of the finger 612. For example, an exterior membrane 668 defining a bladder can attach to the inner portion 630 of the finger 612. The jamming conformal pad 624 can comprise a filler 672 disposed within the bladder, in this example between the exterior membrane 668 and the inner portion 630 of the finger 612. The filler 672 can be operable to facilitate transition of the jamming conformal pad 624 from a compliant configuration to a stiff configuration similar to the various other jamming conformal pads discussed herein. The bladder can be configured in any manner as discussed herein.

In this example, the filler 672 of the jamming conformal pad 624 can comprise jamming particles 676, one or more elongate resilient spacers 690, and an interstitial material (e.g., air, gas, or a fluid) disposed in interstices between the jamming particles 676 and the elongate resilient spacers 690. In one example, the elongate resilient spacers 690 can comprise an elongate member having a high aspect ratio in that it has a length longer than its width or thickness (i.e., a measurement taken along a distance between two points along or within a plane of a cross-sectional area of the elongate resilient spacer that is perpendicular to the longitudinal axis of the resilient spacer, such as a diameter measurement of a circular elongate resilient spacer). In one example, the elongate resilient spacers 690 can comprise an elongate member that has a length between two and fifty times longer than its width or thickness measured in the same dimensions. In an example, the elongate resilient spacers 690 can comprise an elongate member having a length that is two and five times longer than its width or thickness. In another example, the elongate resilient spacers 690 can comprise an elongate member that has a length at least five times longer than its width or thickness, such as between five and 10 times longer than its width or thickness. In another example, the elongate resilient spacers 690 can comprise an elongate member that has a length at least ten times longer than its width or thickness, such as between 10 and 15 times longer than its width or thickness. In another example, the elongate resilient spacers 690 can comprise an elongate member that has a length at least fifteen times longer than its width or thickness, such as between 15 and 20 times longer than its width or thickness. In another example, the elongate resilient spacers 690 can comprise an elongate member that has a length at least twenty times longer than its width or thickness, such as between 20 and 25 times longer than its width or thickness. In another example, the elongate resilient spacers 690 can comprise an elongate member that has a length between twenty and fifty times longer than its width or thickness. However, these ratios are not intended to be limiting in any way.

The elongate resilient spacers 690 can each be formed from a resilient material that is elastically deformable when acted upon by a sufficient force, but that tends to return to an undeformed, original position when the force is removed. In the present example, all or a part of the elongate resilient spacers 690 can be deformable in a number of ways, such as by bending, collapsing in one or more directions along one or more axes, folding, being mashed or smashed, twisting, stretching, and/or buckling when acted upon by a sufficient force. The resilient material used for the elongate resilient spacers 690 can be any suitable resilient material, such as natural or synthetic rubber, silicone, or others as will be recognized by those skilled in the art.

Figure 15B:
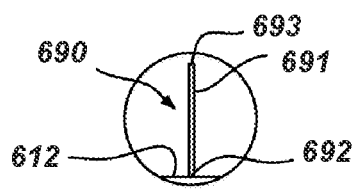
FIG. 15B is a side view of a single resilient spacer in accordance with an example.

The jamming conformal pad 624, and specifically the filler 672, can comprise a plurality of elongate resilient spacers 690 that form a matrix of elongate resilient spacers 690 (i.e. a regular or irregular two-dimensional or three-dimensional configuration, which may or may not be formed in a pattern) contained within the interior volume or hollow of the bladder, in this example as formed by the membrane 668. In the example shown in FIG. 15A, the elongate resilient spacers 690 can each comprise an elongate member 691 having a first end 692 and a second end 693. FIG. 15B illustrates a single elongate resilient spacer 690 for illustrative purposes, comprising an elongate member 691 having a first end 692 and a second end 693. With reference to FIGS. 15A and 15B, the first end 692 of each respective elongate member 691 can be anchored, attached, integrally formed with, or otherwise fixed to the inner portion or inner surface 630 of the finger 612 (or to a membrane of the jamming conformal pad 624 that is disposed and supported on the inner portion or surface 630 of the finger 612). The respective elongate members of the elongate spacers 690 can extend upward from the inner portion or surface 630 towards the exterior membrane 668 of the jamming conformal pad 624 and can terminate at the respective second ends 693. In some examples, the second ends of the respective elongate members of the elongate resilient spacers 690 can comprise a free end that can extend all the way to and terminate at the inner surface of the exterior membrane 668 of the jamming conformal pad 624. In some examples, the respective elongate members of the elongate resilient spacers 690 can extend upward, but with the second or free ends terminating at a distance such that the ends of the elongate resilient spacers 690 are located a distance away from (or in other words do not contact) the inner surface of the exterior membrane 668. In another example, a combination of different sized and configured elongate resilient spacers 690 can be present within the bladder of the jamming conformal pad 624, such that one or more of the resilient spacers 690 are differently configured and/or sized than one or more other of the resilient spacers 690. Any number and configuration of elongate resilient spacers 690 can be included within the bladder, depending upon the desired performance properties of the jamming conformal pad 624. The elongate resilient spacers 690 (e.g., at the first end) can be one of attached to, anchored to, mounted to, integrally formed with, or otherwise fixed to the inner surface of the external membrane 668 in accordance with any attachment method known to those skilled in the art. For example, the first end of one or more respective elongate resilient spacers 690 can be attached using adhesives, bonding, a mechanical mounting device or system (e.g., fasteners, mounting bracket, or others) or any other process. In another example, the first end of one or more respective elongate resilient spacers 690 can be integrally formed with the external membrane 668. Still, in one example, the first end of one or more resilient spacers 690 can be mounted or anchored or attached to the surface 612 of the finger 630 in support of the bladder. In the example shown, the first ends of the respective elongate resilient spacers 690 are mounted directly to the surface 612 of the finger 630 (e.g., using an adhesive).

The elongate resilient spacers 690 can comprise a number of different sizes and configurations depending upon the particular intended application in which they are to be used. In some examples, each of the elongate resilient spacers 690 can be formed having the same size and configuration. For example, each of the elongate resilient spacers 690 can have a circular cross section having the same or a substantially similar diameter and having the same or a substantially similar length. In another example, each of the elongate resilient spacers 690 can comprise a non-uniform cross-sectional area along their respective lengths (e.g., along a longitudinal axis). In the example shown in FIG. 15A, the length of the elongate resilient spacers 690 can be similar to or slightly shorter than a distance between the inner portion or surface 630 of the finger and an inner surface of the exterior membrane 668. In other examples, some of the of elongate resilient spacers 690 can be sized and/or configured differently than some others of the elongate resilient spacers 690. Indeed, at least some of the elongate resilient spacers 690 can be formed to have different dimensions, makeup, and/or configurations. For example, at least some of the elongate resilient spacers 690 can be thicker and/or longer than other elongate resilient spacers 690, some can have different cross-sectional areas, some can have varying cross-sectional areas along a longitudinal length or other axis that differ from the cross-sectional areas of others, some can comprise a composite material makeup, some can be attached to the membrane, and/or some or all can be free-floating. This is true with any of the example resilient spacers discussed herein in any of the examples. In some examples, a length of each of the elongate resilient spacers 690 can be based on a desired or pre-determined profile of the exterior membrane 668 of the jamming conformal pad 624, and their relative position within the jamming conformal pad 624.

Similar to the jamming conformal pads discussed above, the jamming conformal pad 624 can be operatively coupled to a pressure source 680 that can change a pressure in the jamming conformal pad 624 by adding or evacuating fluid into and out of the jamming conformal pad 624. The pressure source 680 can be controlled by a controller 684 in a manner similar as described above.

The jamming conformal pad 624 can be configured to help grip an object 626 or other surface similar to the jamming conformal pads described above. For example, the object 626 can comprise a surface 654 that can have one or more indentations 656 and/or protrusions 658. An outer surface of the exterior membrane 668 of the jamming conformal pad 624 can define an engaging surface 662. In FIG. 15A, the jamming conformal pad 624 is shown in a compliant state, such that when the engaging surface 662 is brought into contact with the surface 654 of the object 626, the engaging surface 662 can conform to the surface 654 of the object 626 including the indentations 656 and/or the protrusions 658. As the engaging surface 662 engages the surface 654 of the object 626, the elongate resilient spacers 690, due to their elastically deformable material makeup, are caused to deform in one or more ways, such as to buckle, fold, collapse, stretch, etc. as the engaging surface 662 conforms to the surface 654 of the object 626 and the exterior membrane 668 takes a profile similar to the surface 654 of the object 626. In the compliant state, the jamming particles 676 are operable to flow in the interstitial material (e.g., air, gas, liquid (e.g., oil), or other fluid) relative to other jamming particles 676 and to the elongate resilient spacers 690.

Figure 15C:
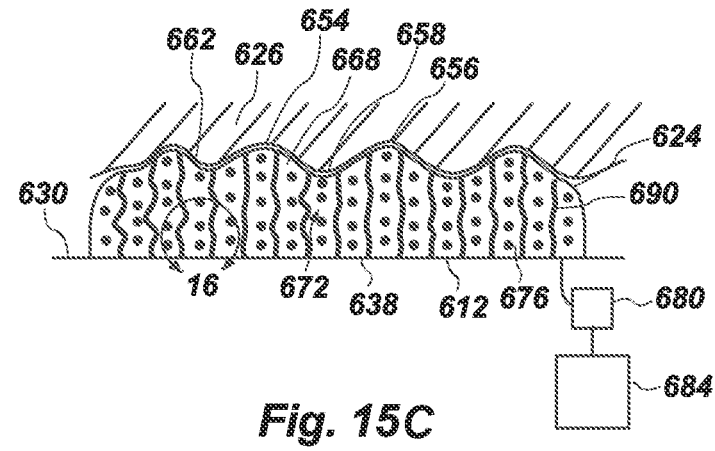
FIG. 15C is a schematic cross-sectional side view of the jamming conformal pad of FIG. 15A shown in a contacting, stiff configuration interfacing with an object in accordance with an example.
Figure 16:
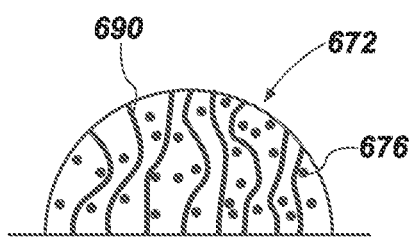
FIG. 16 is a detailed schematic partial side view of the jamming conformal pad of FIG. 15A taken along line 16 of FIG. 15B, showing elongate resilient spacers and particles of the filler with the jamming conformal pad in the contacting, stiff configuration in accordance with an example.

FIG. 15C is a schematic cross-sectional side view of the jamming conformal pad of FIG. 15A shown in operation in a contacting, stiff configuration as engaged with the object 626, and with the outer engaging surface 662 of the membrane 668. When the jamming conformal pad 624 is brought into contact with the surface 654 of the object 626, the filler 672, with the resilient spacers 690, and with the pressure reduced within the volume of the bladder of the jamming conformal pad 624, can be operable to cause the jamming conformal pad 624 to transition to a stiff or static state, such that the engaging surface 662 of the jamming conformal pad 624 remains conformed, or at least partially conformed, to the surface 654 of the object 626 to facilitate gripping of the object 626. Indeed, similar to the jamming conformal pads described above, the controller 684 can cause the pressure source 680 to evacuate at least a portion of the fluid from the jamming conformal pad 624. As the fluid is evacuated from the jamming conformal pad 624, flow characteristics of the jamming particles 676 change, such that the jamming particles 676 are no longer able to flow relative to other jamming particles 676 and to the elongate resilient spacers 690. With reference to FIGS. 15A-16, FIG. 16 is a detailed schematic partial side view of the jamming conformal pad 624 of FIG. 15A taken along line 16 of FIG. 15C, showing the elongate resilient spacers 690 and the jamming particles 676 of the filler 672 in a stiff configuration. As shown, as the fluid is evacuated from the jamming conformal pad 624 via actuation of the controller 684 and the pressure source 680, the jamming particles 676 can be displaced where they can become lodged against and between the elongate resilient spacers 690 and/or other jamming particles 676. In addition, one or more of the elongate resilient spacers 690 can be caused to deform in one or more ways. Thus, in the stiff configuration, one or more of the elongate resilient spacers 690 are in a deformed (e.g., mashed, smashed, buckled, bent, twisted, folded, stretched, and/or collapsed) condition, with the jamming particles 676 lodged against and between the elongate resilient spacers 690 and/or other jamming particles 676 so as to form a stiff structural lattice. In the stiff configuration, the stiff structural lattice formed by the jamming particles 676 and the elongate resilient spacers 690 is operable to maintain the profile of the engaging surface 662 of the jamming conformal pad 624, such that as the jamming conformal pad 624 is caused to maintain a conformed interface with the surface 654 of the object 626, the jamming conformal pad 624 facilitates gripping of the object 626.

The controller 684 can be operable to variably transition the jamming conformal pad 624 between the stiff configuration and the compliant configuration, and to hold such a configuration, or an intermediate configuration between these, by controlling the pressure source 680 to add fluid to the jamming conformal pad 624 or draw fluid from the jamming conformal pad 624. As fluid is added to the jamming conformal pad 624 and the jamming conformal pad 624 is moved away from the object 626 (such as to return to the configuration shown in FIG. 15A), the jamming particles 676 become free to flow again relative to the elongate resilient spacers 690 and other jamming particles 676. Further, the elongate resilient spacers 690 are operable to return to an original, undeformed position (or at least partially return to an original, undeformed position). Thus, the engaging surface 662 of the jamming conformal pad 624 can return to its original configuration ready to interface with another object.

The use of the elongate resilient spacers 690 in connection with the jamming particles 676 can provide several advantages to a jamming conformal pad over a similar jamming conformal pad without such resilient spacers. As one example advantage, the elongate resilient spacers 690 can deform elastically, such as by buckling, bending, or otherwise when an object 626 impinges on the jamming conformal pad 624, thereby influencing the conformal behavior of the jamming conformal pad 624. When the jamming conformal pad 624 is separate from the object 626, the pressure restored or at least partially restored to the jamming conformal pad 624, the elongate resilient spacers 690 functions to aid the return of the jamming conformal pad 624 to an original size and shape via the elastic/resilient nature of the elongate resilient spacers 690. In other words, the resilient spacers 690 can operate to apply a force (direct or indirect depending upon the configuration of the jamming conformal pad) to the deformed membrane 668 of the bladder to facilitate its return to an original size and shape. This application of force can occur directly (i.e., the resilient spacers 690 directly act upon the membrane 668), or indirectly, wherein the application of force is applied by the resilient spacers 690 to the jamming particles 667, which can subsequently transfer the force to the membrane 668.

Further, the number, size and spacing of the elongate resilient spacers 690 within the matrix of elongate resilient spacers can be established so as to enable a reduced number of jamming particles 676 to be present in the jamming conformal pad 624 while still achieving the intended function of the jamming conformal pad 624 as compared with a jamming conformal pad without resilient spacers. In this manner, a jamming mechanism and function similar to the jamming conformal pads described above is achieved and effective.

As another advantage, the stiff structural lattice formed in the bladder with the jamming conformal pad 624 in the stiff configuration when fluid is evacuated from the jamming conformal pad 624 is able to be strengthened due to the presence of the resilient spacers 690, which, when deformed, function to facilitate an increase in the surface to surface contact with the particles 676 by filling, at least partially, the interstitial voids between the particles 676 and contacting a greater surface area of the particles 676 than would an adjacent particle 676. In other words, the resilient spacers 690 can conform to and partially wrap around the jamming particles 676. This helps to reduce the slippage between particles 624 (i.e., the coefficient of static friction is increased between the jamming particles 676) as each jamming particle in contact with a resilient spacer is less likely to move as compared to the situation with the jamming conformal pads described above where the jamming particles are engaged only with one another and in some cases, the membrane of the bladder and/or the surface of the structure of the finger as well.

The elongate resilient spacers 690 also have the advantage of taking up volume within the interior pocket or hollow of the bladder of the jamming conformal pad 624. In this manner, the jamming conformal pad 624 can more quickly and easily transition from a compliant configuration to a stiff configuration because less interstitial material, such as a fluid (e.g. a difference of an amount of fluid equal to the volume occupied by the elongate resilient spacers), needs to be removed from the jamming conformal pad 624 to achieve the proper jamming and the stiff configuration as compared to a jamming conformal pad without elongate resilient spacers.

Figure 17:
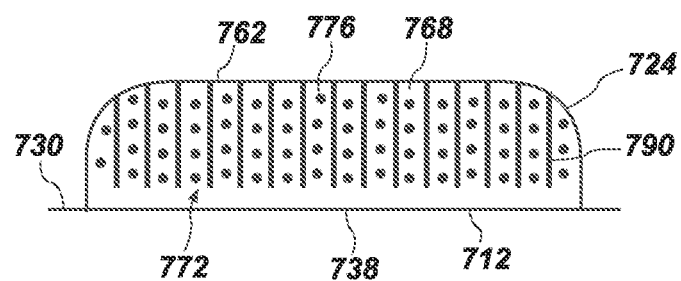
FIG. 17 is a schematic cross-sectional side view of a jamming conformal pad shown in a non-contacting, compliant configuration in accordance with an example, with the jamming conformal pad comprising elongate resilient spacers attached or anchored to an inner surface of an upper portion of a membrane.

FIG. 17 is a schematic cross-sectional side view of a jamming conformal pad with elongate resilient spaces attached to a membrane of the jamming conformal pad. In the example shown in FIG. 17, a jamming conformal pad 724 can be similar to the jamming conformal pad 624 in many respects. For example, the jamming conformal pad 724 can comprise a bladder having an external membrane 768 operable with a finger or other part of a robot end effector, with the external membrane 768 having and defining a conformal engaging surface 762 that interfaces with an object to facilitate engagement with the object. The jamming conformal pad 724 can be disposed on an inner portion 730 of a segment 738 of a finger 712, as shown. In some examples, the external membrane 768 of the bladder can have a single layer, or in another example, the bladder can comprise a membrane having multiple layers, such as an inner layer and an outer layer that each define the interior volume or hollow of the bladder and the jamming conformal pad 724.

In this example, a filler 772 can comprise jamming particles 776 and one or more elongate resilient spacers 790 contained within the bladder. As shown in FIG. 17, the elongate resilient spacers 790 can be supported by and extend from an inner portion of the external membrane 768. The elongate resilient spacers 790 can each comprise an elongate member having a first end and a second end. The first end can be attached, adhered to, anchored, coupled to, integrally formed with, or otherwise fixed to the external membrane 768, with the second end comprising a free end. Each elongate resilient spacer 790 can be configured to extend away from the external membrane 768 toward the inner portion 730 of the finger 712, and into the interior volume or hollow of the bladder of the jamming conformal pad 724. In some examples, the length of the elongate resilient spacers 790 can be such that the second end terminates at a distance equal to or slightly shorter than a distance between the external membrane 768 and the inner portion 730 of the finger 712 with the membrane in an extended, compliant configuration as shown. The elongate resilient spacers 790 can each comprise the same size and/or configuration, or different ones can comprise different size and/or configurations, as with the elongate resilient spacers 690 of FIGS. 15A-15C. The jamming conformal pad 724 can be put into operation in a similar manner as the jamming conformal pad 624, as well as other jamming conformal pads described herein. Thus, the above-described details of the operation of the jamming conformal pad 724 is omitted here for brevity.

The elongate resilient spacers 790, and namely the respective first ends of the elongate members of the elongate resilient spacers 790, as supported by the external membrane 768, can be one of attached to, anchored to, mounted to, integrally formed with, or otherwise fixed to the inner surface of the external membrane 768 in accordance with any attachment method known to those skilled in the art. For example, the one or more elongate resilient spacers 790 can be attached using adhesives, bonding, or any other process. In another example, the elongate resilient spacers 790 can be integrally formed with the external membrane 768. While FIG. 17 shows the first ends of the elongate members of the elongate resilient spacers 790 attached to an upper portion of the external membrane 768, this is not intended to be limiting in any way. Indeed, the first ends of the elongate members of one or more elongate resilient spacers 790 can be attached or anchored or otherwise fixed to the external membrane 768 at any location along the inner surface of the external membrane 768. In addition, different elongate resilient spacers 790 can be attached or anchored or otherwise fixed to the internal surface of the external membrane 768, such that the plurality of elongate resilient spacers 790 extend in multiple respective directions with respect to the external membrane 768 and/or the inner portion 730 of the finger 712. Moreover, in one aspect, the spacing between the plurality of elongate resilient spacers 790 can be uniform, or the same at their base (i.e., at the mounting location). In another aspect, the spacing can be non-uniform or random. Or, a combination of these is contemplated, with some evenly spaced apart from one another, and with others differently spaced apart from one another. Still, in another example, the resilient spacers 790 can be mounted, anchored, attached or otherwise fixed to the surface 712 of the finger 730 in support of the bladder (similar to the resilient spacers 690 of FIGS. 15A-15C) in addition to being mounted or anchored or attached to the external membrane 768. In other words, in one example, the jamming conformal pad can comprise a combination of elongate resilient spacers as shown in FIGS. 15A and 17, or more generally speaking, a plurality of elongate resilient spacers supported by any two or more, or all, of the surfaces that define the interior volume of the bladder.

In the example of FIG. 17, with the pressure source operable with the jamming conformal pad 724 inactive and the jamming conformal pad 724 in a compliant configuration, the elongate resilient spacers 790 can be configured to provide the bladder and the external membrane 768 with a pre-determined, designed volumetric shape or configuration and a corresponding outer surface configuration as the elongate resilient spacers 790 act or function to exert a force between the external membrane 768 and the finger 712. This pre-determined shape can be designed or tuned by varying the size, number, configuration, and/or the material makeup, of the elongate resilient spacers 790, as well as other properties of the jamming conformal pad 724, such as the number, size, configuration, and/or material makeup of the jamming particles within the bladder that interact with the elongate resilient spacers 790, and the material makeup and configuration of the membrane 768. Of course, upon actuation of the pressure source operable with the jamming conformal pad 724 to transition the jamming conformal pad from a compliant configuration to a stiff configuration, the resilient elongate spacers 790 can be caused to elastically deform as discussed herein, with these returning to an original size and shape upon removal of the pressure within the bladder.

In each of the examples illustrated in FIGS. 15A-15C, and FIG. 17, the elongate resilient spacers have a first end that is attached, coupled to, integrally formed with, or otherwise fixed, and a second end that comprises a free end, or in other words, an end not attached or coupled to any structure (i.e., a floating end). This free end facilitates movement of the elongate resilient spacers in three-dimensional space within the bladder, or in other words, movement within one or more of the six spatial movements relative to the three axes in cartesian coordinate space, namely the free ends (and by extension the elongate resilient spacers) can move in a translational direction along any one of the x, y, and z axes, and they can move in a rotational direction along these same axes, or they can move in a combination of these. They can also twist about their own longitudinal axis. This freedom of movement allows the elongate resilient spacers to be able to move and perform their intended function in a number of different positions within the bladder in response to whatever type or shape or configuration of object the jamming conformal pad is being caused to interact with. With this configuration of the elongate resilient spacers, the fixed end keeps the elongate resilient spacers from free-floating within the bladder, while the free end facilitates a significant degree of freedom of movement as compared to if the second end were also attached, coupled to, integrally formed with, or otherwise fixed to a structure, such as the membrane.

Figure 18:
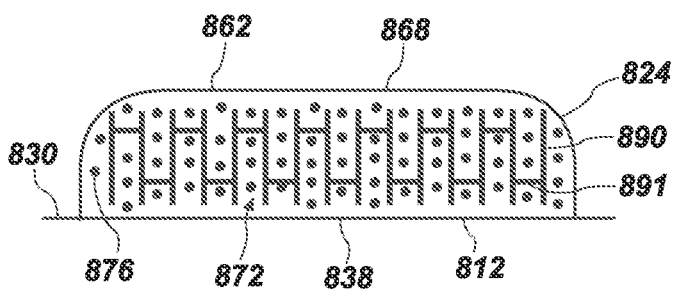
FIG. 18 is a schematic cross-sectional side view of a jamming conformal pad with unanchored and interconnected elongate resilient spacers in accordance with an example.

FIG. 18 is a schematic cross-sectional side view of a jamming conformal pad with unanchored or free-floating elongate resilient spacers. In the example shown, a jamming conformal pad 824 can be similar to the jamming conformal pads 624 and 724 in many respects. For example, the jamming conformal pad 824 can comprise a bladder comprising an external membrane 868 operable with a finger or other part of a robot end effector, with the external membrane 868 having and defining a conformal engaging surface 862 that interfaces with an object to facilitate engagement with the object. The jamming conformal pad 824 can be disposed on an inner portion 830 of a segment 838 of a finger 812, as shown. In some examples, the external membrane 868 of the bladder can have a single layer, or in another example, the bladder can comprise a membrane having multiple layers, such as an inner layer and an outer layer that each define the interior volume or hollow of the bladder and the jamming conformal pad 824.

In this example, a filler 872 can comprise jamming particles 876 and elongate resilient spacers 890 contained within the bladder. As shown in FIG. 18, the elongate resilient spacers 890 can be unanchored or free-floating within the bladder, with the jamming particles 876 interspersed within the bladder, such that the elongate resilient spacers 890 are disposed within and about the jamming particles 876. In this example, unlike the resilient spacers 690 and 790 discussed above with respect to FIGS. 15A-17, no part of the elongate resilient spacers 890 in this example is connected to either of the inner portion 830 of the finger 812 or to the external membrane 868. However, in some examples, at least some or all of the elongate resilient spacers 890 can be spaced from one another and formed in a matrix by being interconnected to one another via one or more lateral connections 891. In the example shown, each one of the plurality of elongate resilient spacers 890 are interconnected with another one of the elongate resilient spacers 890, but this is not intended to be limiting in any way. Moreover, two or more elongate resilient spacers can be interconnected using more than one lateral connection. In some examples, the length of the elongate resilient spacers 890 can be a distance equal to or slightly shorter than a distance between the external membrane 868 and the inner portion 830 of the finger 812. The lengths and/or configurations of one or more of the plurality of elongate resilient spacers 890 can be all the same, or different elongate resilient spacers 890 can have different lengths and/or configurations one from another. In one example, differing lengths can contribute or help facilitate to a pre-defined desired volumetric configuration of the jamming conformal pad 824, as well as a corresponding outer surface configuration of the jamming conformal pad 824 with the pressure source operable with the jamming conformal pad 824 inactive and the jamming conformal pad 824 in a compliant configuration (i.e., absent any object interaction and prior to activation of the system to draw pressure from the jamming conformal pad) as the elongate resilient spacers 890 act or function to exert a force between the external membrane 868 and the finger 812. The pre-determined size, shape or configuration of the jamming conformal pad 824 can be designed or tuned by varying the size, number, configuration, and/or the material makeup, of the elongate resilient spacers 890, the lateral connections 891, as well as other properties of the jamming conformal pad 824, such as the number, size, configuration, and/or material makeup of the particles within the bladder that interact with the elongate resilient spacers 890. Of course, upon actuation of the pressure source operable with the jamming conformal pad 824 to transition the jamming conformal pad 824 from a compliant configuration to a stiff configuration, the resilient elongate spacers 890 can be caused to elastically deform as discussed herein, with these returning to an original size and shape upon removal of the pressure within the bladder. Moreover, the elongate resilient spacers 890 can comprise any number, size and/or configuration, and can all be made of the same material, or some or all can be made of different materials.

The jamming conformal pad 824 can operate similar to the jamming conformal pads 624 and 724, and the elongate resilient spacers 890 can operate and function similar to the elongate resilient spacers 690 and 790, wherein they are configured to elastically deform and interact with the jamming particles 876. Thus, the above-described details of the operation of the jamming conformal pad 824 is omitted for brevity. However, it is noted that, during operation, the elongate resilient spacers 890 can be more free to move within the bladder than other elongate resilient spacers discussed herein, such as elongate resilient spacers 690 and 790, as they are not attached or otherwise fixed to the finger or the membrane of the bladder, or in other words as they are free-floating.

Figure 19:
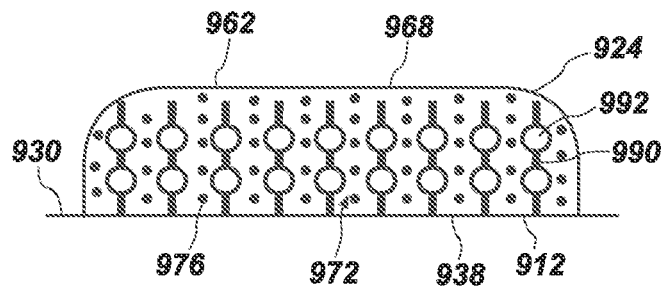
FIG. 19 is a schematic cross-sectional side view of a jamming conformal pad with elongate resilient spacers having non-uniform cross sections in accordance with an example.

FIG. 19 is a schematic cross-sectional side view of a jamming conformal pad with elongate resilient spacers having non-uniform cross sections. In the example shown in FIG. 19, a jamming conformal pad 924 can be similar to the jamming conformal pads 624, 724, and 824 in many respects. For example, the jamming conformal pad 924 can comprise a bladder having an external membrane 968 operable with a finger or other part of a robot end effector, with the external membrane 968 having and defining a conformal engaging surface 962 that interfaces with an object to facilitate engagement with the object. The jamming conformal pad 924 can be disposed on an inner portion 930 of a segment 938 of a finger 912, as shown. In some examples, the external membrane 968 of the bladder can have a single layer, or in another example, the bladder can comprise a membrane having multiple layers, such as an inner layer and an outer layer that each define the interior volume or hollow of the bladder and the jamming conformal pad 924.

In this example, a filler 972 can comprise jamming particles 976 and one or more elongate resilient spacers 990. As shown in FIG. 19 and as mentioned above, the elongate resilient spacers 990 comprise an elongate member having a first end and a second end. Each of the first ends of the elongate members of the respective elongate resilient spacers 990 can be anchored or mounted to an inner portion of the external membrane 968 (or directly to a surface of the finger 912)(and along a top and/or bottom of the membrane 968), and can have a non-uniform cross-section along a length of the elongate resilient spacers 990. In this example, the elongate resilient spacers 990 comprise one or more protruding portions 992. The protruding portions 992 are shown to comprise a spherical or semi-spherical shape in FIG. 19. However, the protruding portions 992 can comprise any size, shape or configuration. In some examples, a non-uniform cross section of the elongate resilient spacers 990 can enhance the jamming of the jamming particles 976 when the jamming conformal pad 924 is in the stiff configuration by further enabling the jamming particles 976 to lodge into and between the elongate resilient spacers 990. The elongate resilient spacers 990 with their protruding portions 992 can further take up a larger volume within the jamming conformal pad 924 (as compared to a resilient spacer without protruding portions, such as that shown in FIG. 15A) while allowing for the jamming particles 976 to flow within the jamming conformal pad 924. The elongate resilient spacers 990 can be fixed at the first end, with the elongate member being configured to extend away from the external membrane 968 toward the inner portion 930 of the finger 912, and into the interior volume or hollow of the bladder of the jamming conformal pad 924 with the elongate member terminating at the second end, which in this example comprises a free end. Operation of the jamming conformal pad 924 can be similar to the operation of the other jamming conformal pads discussed herein, and thus the operation is not repeated here. In addition, the purpose and function of the filler 972, the jamming particles 976, and the elongate resilient spacers 990 can be the same or similar to the other fillers, jamming particles, and elongate resilient spacers described herein.

Figure 20:
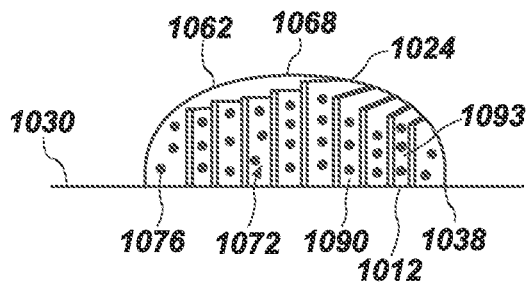
FIG. 20 is a schematic cross-sectional side view of a jamming conformal pad with elongate resilient spacers having an opposing surface configuration in accordance with an example.

FIG. 20 is a schematic cross-sectional side view of a jamming conformal pad with elongate resilient spacers having opposing extended surfaces providing increased surface area to each of the respective elongate resilient spacers over the other elongate resilient spacers discussed herein. In the example shown in FIG. 20, a jamming conformal pad 1024 can be similar in at least some aspects to the jamming conformal pad 624, 724, 824, 924. For example, the jamming conformal pad 1024 can comprise a bladder having an external membrane 1068 operable with a finger or other part of a robot end effector, or other structure or system, with the external membrane 1068 having and defining a conformal engaging surface 1062 that interfaces with an object to facilitate engagement with the object. The jamming conformal pad 1024 can be disposed on an inner portion 1030 of a segment 1038 of a finger 1012, as shown. In some examples, the external membrane 1068 of the bladder can have a single layer, or in another example, the bladder can comprise a membrane having multiple layers, such as an inner layer and an outer layer that each define the interior volume or hollow of the bladder and the jamming conformal pad 1024.

In this example, a filler 1072 can comprise jamming particles 1096 and elongate resilient spacers 1090. As shown in FIG. 20, the elongate resilient spacers 1090 can comprise a thin plate-like or blade-like configuration with opposing surfaces that each have a width defining a surface area at least three times greater than a cross-sectional surface area measured along a plane perpendicular to a longitudinal axis of the elongate resilient spacers 1090. In some examples, the surface area of the opposing surfaces can be 3-4 times greater, 3-5 times greater, 3-6 times greater, 3-7 times greater, 3-8 times greater, 3-9 times greater, 3-10 times greater, 10-15 times greater, 10-20 times greater, or more, than the cross-sectional surface area measured along a plane perpendicular to a longitudinal axis of the elongate resilient spacers 1090. In one example, the opposing surfaces can comprise a planar configuration. However, this is not intended to be limiting in any way as one or both of the surfaces can comprise any other type of configuration (e.g., non-planar or curved, a combination of planar and non-planar, and others). Moreover, the one or both of the opposing surfaces can be smooth, rough, or configured with a pattern of protrusions/indentations. By using the elongate resilient spacers 1090 with opposing surfaces, the elongate resilient members can be operable to resist bending or buckling on one direction while enabling bending and buckling in another direction. In this manner, the conformance of the jamming conformal pad 1024 can be better controlled than other jamming conformal pads discussed herein that support elongate resilient spacers having higher aspect ratios. Moreover, the opposing surfaces of the elongate resilient spacers 1090 can provide an increase in the surface area available to interact with the various jamming particles 1096, wherein a greater number of jamming particles 1096 can interact with and come in contact with any one or more of the various elongate resilient spacers 1090. In the above examples, various jamming conformal pads are described that can help enable a robotic end-effector to grip an object or other surface. However, the various jamming conformal pads as described herein can also function as a stiffening element for a robotic joint. Examples of such stiffening elements are described in detail in U.S. Patent Application Publication No. 2019/0184576, the contents of which are hereby incorporated by reference in their entirety.

Figure 21A:
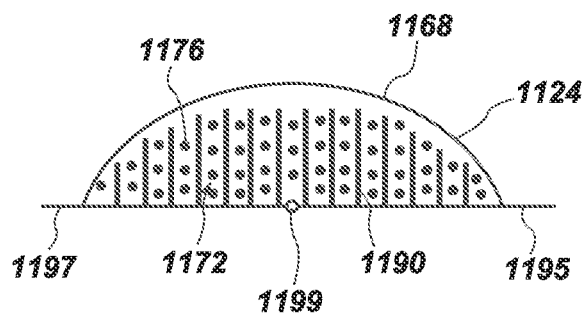
FIG. 21A is a schematic side view of a stiffening element in accordance with an example, shown in a first position and a relaxed configuration.

FIG. 21A is a schematic side view of a jamming conformal pad in the form of a joint stiffening element 1124 in accordance with an example of the present disclosure, shown in a first position and a relaxed configuration. The joint stiffening element 1124 can be similar in form and function to any of the jamming conformal pads described above. The joint stiffening element 1124 can be disposed on or supported about both a first member 1195 and a second member 1197 that are connected by a joint 1199, and that are rotatable relative to one another. The joint stiffening element 1124 can comprise an external membrane 1168 defining a bladder and a filler 1172 disposed within the bladder. The filler 1172 can comprise jamming particles 1176 and one or more elongate resilient spacers 1190, as taught herein. For example, similar to the jamming conformal pads described above, the joint stiffening element 1124 can be operable to have a compliant configuration or state and a stiff configuration or state. In the compliant configuration, the first and second members 1195, 1197 can move about the joint 1199 without the joint stiffening element 1124 applying a force operable to resist rotation of the first and second members 1195, 1197 about the joint 1199 (other than a negligible resistance force due to friction between the elements within the bladder). In the compliant configuration, when the first and second members 1195, 1197 move, the jamming particles 1176 can flow and the elongate resilient spacers 1190 can deform based on the profile of the external membrane 1168 and the extent of the rotation of the joint 1199. On the other hand, the joint stiffening element 1124 can act as a brake to impede and/or prevent rotational motion of the first and second members 1195, 1197 about the joint 1199 when the joint stiffening element 1124 is caused to transition between the compliant configuration and the stiff configuration in a similar manner as the jamming conformal pads as taught herein.

Figure 21B:
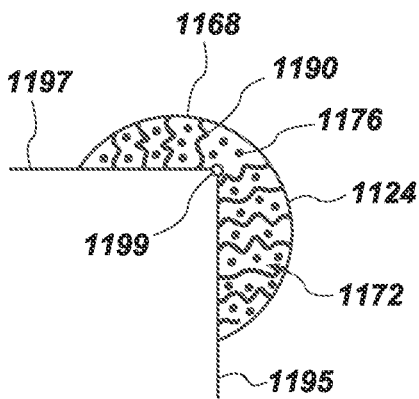
FIG. 21B is a schematic side view of the stiffening element of FIG. 21A, shown in a second position and a stiff configuration in accordance with an example.

FIG. 21B is a schematic side view of the joint stiffening element of FIG. 21A, shown in a second position and in a stiff configuration. Similar to the jamming conformal pads above, an interstitial material (e.g., air, gas, fluid) can be evacuated all or in part from the joint stiffening element 1124, thus causing the jamming particles 1176 to become lodged or increasingly frictionally engaged (e.g., the coefficient of friction between the particles 1176 themselves and the particles 1176 and the elongate resilient members 1190 with increasing pressure reduction within the bladder) with the elongate resilient members 1190 and other jamming particles 1176. The pressure source (or the pressure source in connection with one or more valves) operable with the joint stiffening element 1124 can be configured to vary the pressure within the bladder of the joint stiffening element 1124. In one aspect, the pressure within the bladder can be varied to vary the braking force applied to the joint 1199. In other words, the pressure can be varied such that the joint stiffening element 1124 can be caused to enter into different variable configurations or states at or between the compliant and stiff configurations. In another aspect, the pressure can be caused to be sufficient so as to cause the joint stiffening element 1124 to enter the stiff configuration, wherein the jamming particles 1176 and the elongate resilient spacers 1190 no longer move, but are locked into place, thus forming a structural lattice within the bladder, and thus preventing rotational motion of the first and second members 1195, 1197 about the joint 1199.

Accordingly, resistance to movement of the first and second members 1195, 1197 can be controlled using the joint stiffening element 1124. Similar to the jamming conformal pads described above, the joint stiffening element 1124 can be connected to the pressure source (or pressure source in connection with one or more valves) to control the pressure within the joint stiffening element 1124. Flow characteristics of the jamming particles 1176 can vary with the pressure within the joint stiffening element 1124. As the pressure decreases, the jamming particles' 1176 ability to flow decreases and the joint stiffening element 1124 transitions toward the stiff configuration. As the pressure increases, the jamming particles' 1176 ability to flow increases and the joint stiffening element 1124 transitions towards the relaxed or compliant configuration.

It is noted herein that the various resilient spacers discussed above and shown in the drawings are not intended to be limiting in any way. Indeed, those skilled in the art will recognize the numerous different shapes, sizes, material makeups, and configurations that can be adopted and implemented to provide one or more resilient spacers within a bladder of a jamming conformal pad and/or a joint stiffening element that are not specifically shown or described herein, but that are nonetheless contemplated herein.

Figure 22:
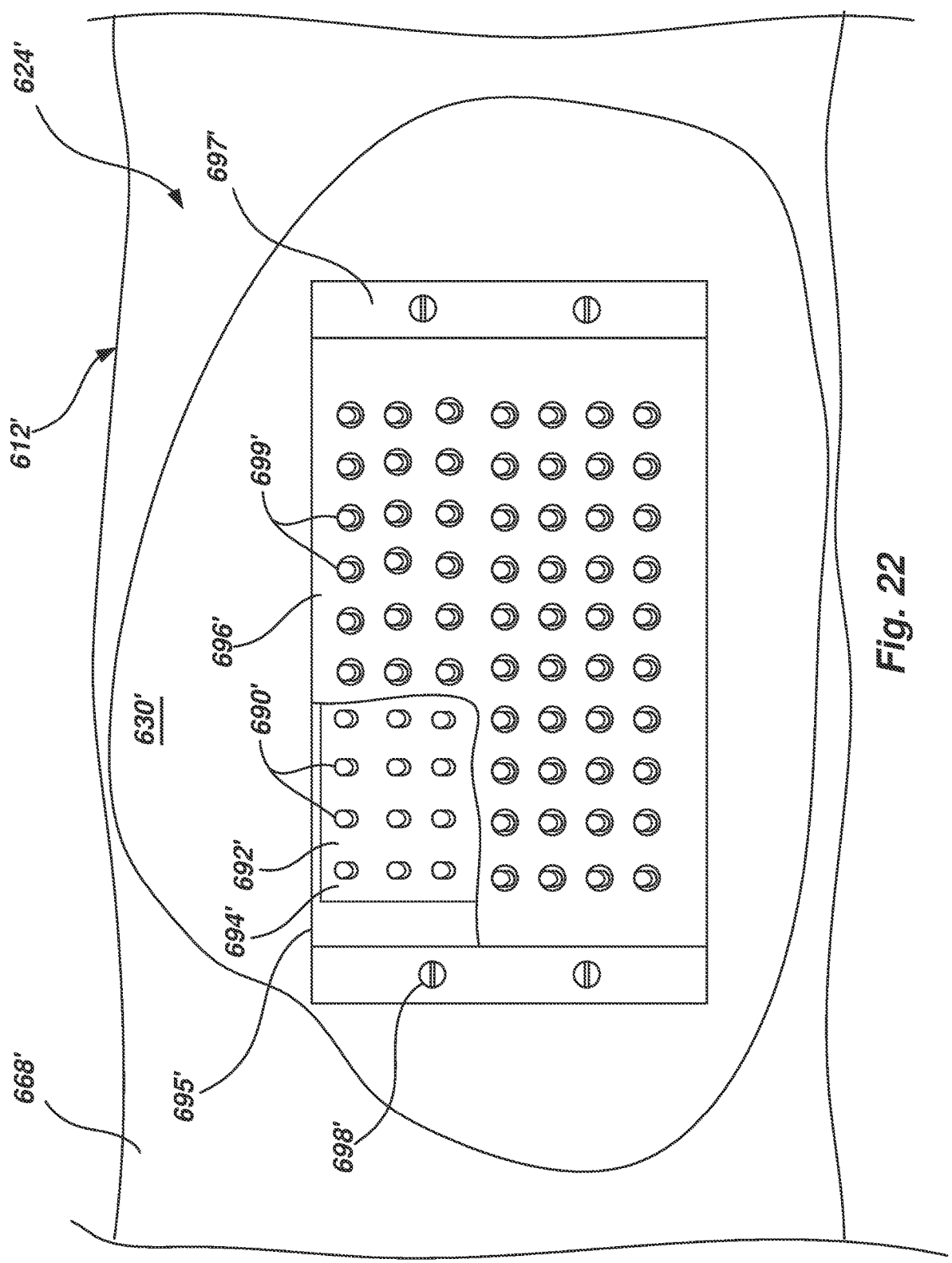
FIG. 22 illustrates a top view of a jamming conformal pad about a finger of an end-effector of a robotic device or system, in accordance with an example, wherein a portion of the external membrane is cut-away to show inside the hollow or interior volume of the jamming conformal pad, and wherein a portion of the mounting bracket is also cut-away to show the base substrate and resilient spacers supported thereon.

With reference to FIG. 22, illustrated is one example way of configuring and mounting the plurality of resilient spacers 690' (similar to the resilient spacers 690 of FIGS. 15A and 15C, but these can also comprise any of the resilient spacer configurations described in FIGS. 15A-20, or other configurations as will be apparent to those skilled in the art) to the finger 612' of the robotic end-effector. In this example, a first end of each of the plurality of resilient spacers 690' can be integrally formed with and supported by a base substrate 692', wherein the resilient spacers 690' are configured to extend away from an upper surface 694' of the base substrate 692' terminating at a second end, which comprises a free end. The base substrate 692' can be formed of the same material as the resilient spacers 690', or from a different material. The base substrate 692' can be any size, shape or configuration, and can support any number of resilient spacers 690' arranged in any manner. In the example shown, the base substrate 692' comprises a rectangular configuration in support of ten columns and seven rows of resilient spacers 690'. Of course, this is not intended to be limiting in any way as any number of resilient spacers 690' can be supported from the base substrate 692' in any pattern or arrangement, including uniform and random locations on the base substrate 692' and spacing from one another.

The robotic end-effector can and the jamming conformal pad 624' can further comprise a mounting bracket 695' operable to receive the base substrate 692' and to facilitate mounting of the base substrate 692 and the resilient spacers 690' to the surface 630' of the finger 612'. The mounting bracket 695' can comprise one or more mounting flanges 697' operable to receive one or more fasteners 698' that secure the mounting bracket 695' to the finger 612'. The mounting bracket can further comprise a riser 696' elevated from and extending between the mounting flanges 697'. The riser 696' can be sized to receive the base substrate 692', and can comprise a plurality of holes 699' formed therein that are configured to receive a respective one of the plurality of resilient spacers 690', wherein the resilient spacers 690' extend upward through the holes 699' and into the volume or hollow of the bladder formed by the external membrane 668' of the jamming confirming pad 624'. Of course, this is merely one example of a variety of ways in which the resilient spacers 690 can be attached or mounted to the finger 612' of the end-effector, such that they maintain a consistent position within the bladder and from one another.

It is noted that in some examples, the base substrate 692' can be mounted directly to the finger 612' (or to a membrane of the jamming conformal pad 624' that is disposed and supported on the inner portion or surface 630' of the finger 612') without the use of a mounting bracket 695'. For example, the base substrate 692' with its resilient spacers 690' can be mounted to the finger 612' using adhesives, one or more fasteners, or a combination of these.

The following examples are further illustrative of several various embodiments of the present technology.

1. A robotic end-effector configured to provide conformal object interaction, comprising:
    one or more fingers, each having an inner portion and each operable in one or more degrees of freedom; and
    one or more jamming conformal pads, each pad disposed on the inner portion of a corresponding finger of the one or more fingers, each jamming conformal pad comprising:
        an exterior membrane conformable to a surface of an object, and
        a filler disposed between the membrane and the inner portion of the at least one finger, the filler comprising a plurality of elongate resilient spacers and a plurality of jamming particles.
2. The robotic end-effector of example 1, wherein each of the one or more jamming conformal pads is operable in at least one of two pad configurations, the at least two pad configurations comprising:
    a compliant configuration in which a shape of the jamming conformal pad is changeable to achieve an engaged shape upon engagement of the pad with the surface of the object; and
    a stiff configuration in which the jamming conformal pad maintains the engaged shape, and is relatively stiff compared to the jamming conformal pad in the compliant configuration.
3. The robotic end-effector of any preceding example, wherein the elongate resilient spacers each comprise a first end fixed to the inner portion of the at least one finger, and a second end comprising a free end.
4. The robotic end-effector of any preceding example, wherein the respective second ends of the elongate resilient spacers extend upward from the inner portion of the at least one finger toward the exterior membrane, and terminate at a distance away from the exterior membrane.
5. The robotic end-effector of any preceding example, wherein the respective second ends of the elongate resilient spacers extend upward from the inner portion of the at least one finger toward the exterior membrane, and terminate at the exterior membrane so as to be in contact with the exterior membrane.
6. The robotic end-effector of any preceding example, wherein the elongate resilient spacers apply a force to the exterior membrane to provide a pre-determined shape to the exterior membrane.
7. The robotic end effector of any preceding example, wherein at least some of the plurality of elongate resilient spacers have a uniform cross-section along a length of the elongate resilient spacers.
8. The robotic end effector of any preceding example, wherein the plurality of elongate resilient spacers define a matrix of elongate resilient spacers.
9. The robotic end effector of any preceding example, wherein at least some of the plurality of elongate resilient spacers are interconnected with one another.
10. The robotic end effector of any preceding example, wherein the elongate resilient spacers are configured to deform elastically to achieve the engaged shape upon engagement of the jamming conformal pad with the surface of the object, and wherein the elongate resilient spacers at least partially recover to an original, undeformed condition upon disengagement of the jamming conformal pad from the surface of the object.

11. The robotic end effector of any preceding example, wherein, in the stiff configuration, the jamming particles and the elongate resilient spacers form a stiff structural lattice.

12. The robotic end-effector of any preceding example, wherein the jamming conformal pad is operable to distribute across the surface of the object and at least partially infiltrate into any indentations in the surface, defining a conformal engaging surface configured to match and mate with the surface of the object, and wherein the one or more jamming conformal pads comprises an active area capable of changing compliant characteristics to alternately change and maintain a contour of the conformal engaging surface.

13. The robotic end-effector of any preceding example, wherein the conformal engaging surface is an active surface capable of alternately changing and maintaining a contour.

14. The robotic end-effector of any preceding example, wherein the filler has at least two configurations, the configurations comprising:
   a flowable configuration, corresponding to the compliant configuration of the jamming conformal pad, in which the jamming particles of the filler flow and the elongate resilient spacers deform as the exterior membrane conforms to the surface; and
   a static configuration, corresponding to the stiff configuration of the jamming conformal pad, in which the jamming particles are lodged between the elongate resilient spacers of the filler, and in which the jamming particles and the elongate resilient spacers are static as compared to flowable configuration.

15. The robotic end-effector of any preceding example, wherein the jamming conformal pad is binary, and operable only in the compliant and stiff configurations.

16. The robotic end-effector of any preceding example, wherein the jamming conformal pad is analog, and is operable in multiple varying degrees of stiffness between the compliant and stiff configurations.

17. The robotic end-effector of any preceding example, wherein the jamming conformal pad further comprises:
   a bladder defined by the exterior membrane, the bladder being supported on the inner portion of the at least one finger,
   wherein flow characteristics of the jamming particles interacting with the plurality of elongate resilient spacers of the filler vary with pressure within the bladder, and compliance of the bladder varies with the flow characteristics of the jamming particles and the elongate resilient spacers.

18. The robotic end-effector of any preceding example, wherein the bladder changes shape upon contact with the object; and wherein the jamming particles flow and move with respect to the elongate resilient spacers, and the elongate resilient spacers deform within the bladder, as the bladder changes shape.

19. The robotic end-effector of any preceding example, wherein the filler further comprises an interstitial material disposed in interstices between the jamming particles and the elongate resilient spacers.

20. The robotic end-effector of any preceding example, wherein the filler further comprises a fluid disposed in interstices between the jamming particles and the elongate resilient spacers.

21. The robotic end-effector of any preceding example, wherein at least some of the plurality of elongate resilient spacers comprise a non-uniform cross-section along a longitudinal axis of the elongate resilient spacers.

22. The robotic end-effector of any preceding example, wherein at least some of the plurality of elongate resilient spacers comprise opposing surfaces, each opposing surface having a surface area greater than a cross-sectional surface area measured along a plane perpendicular to a longitudinal axis of the elongate resilient spacers, respectively.

23. The robotic end-effector of any preceding example, wherein at least some of the plurality of elongate resilient spacers are integrally formed with the exterior membrane.

24. The robotic end-effector of any preceding example, wherein at least some of the plurality of elongate resilient spacers are fixed to at least one of the exterior membrane or the inner portion of the finger using at least one of an adhesive or a bonding agent.

25. The robotic end-effector of any preceding example, wherein at least some of the plurality of elongate resilient spacers are fixed to at least one of the exterior membrane or the inner portion of the finger via a mechanical mounting device.

26. The robotic end-effector of any preceding example, wherein the plurality of elongate resilient spacers are integrally formed with a base substrate, and extend away from the base.

27. The robotic end-effector of any preceding example, further comprising a mounting bracket operable to mount the base and the elongate resilient spacers to the finger.

28. The robotic end-effector of any preceding example, further comprising a pressure source operatively coupled to the jamming conformal pad and operable to vary the pressure within the jamming conformal pad.

29. The robotic end-effector of any preceding example, wherein the pressure source is operable to provide a variable range of pressures within the jamming conformal pad to provide a variable degree of compliance to the jamming conformal pad between the compliant and stiff configurations.

30. A robotic end-effector, comprising:
   a pair of members being movable with respect to one another;
   a bladder on at least one of the members; and
   a filler within the bladder comprising a plurality of jamming particles and a plurality of elongate resilient spacers, wherein each of the plurality of jamming particles is operable to flow within the bladder, wherein flow characteristics of the plurality of jamming particles about themselves and the plurality of elongate resilient spacers vary with pressure within the bladder, and wherein compliance of the bladder varies with the flow characteristics of the jamming particles;
   wherein the bladder with the filler therein has at least two configurations, comprising:
      a compliant configuration in which a shape of the bladder and filler are changeable; and
      a stiff configuration in which change in the shape of the bladder and filler is resisted, and in which the bladder and filler are stiff as compared to the bladder and filler in the compliant configuration.

31. The robotic end-effector of any preceding example, wherein the bladder changes shape upon contact with the object; and wherein the jamming particles flow and move with respect to the elongate resilient spacers, and the elongate resilient spacers deform within the bladder, as the bladder changes shape.

32. The robotic end-effector of any preceding example, wherein the filler further comprises an interstitial material disposed in interstices between the jamming particles and the elongate resilient spacers.

33. The robotic end-effector of any preceding example, wherein the filler further comprises a fluid disposed in interstices between the jamming particles and the elongate resilient spacers.

34. The robotic end-effector of any preceding example, wherein at least some of the plurality of elongate resilient spacers comprise a non-uniform cross-section along a longitudinal axis of the elongate resilient spacers.

35. The robotic end-effector of any preceding example, wherein at least some of the plurality of elongate resilient spacers comprise opposing surfaces, each opposing surface having a surface area greater than a cross-sectional surface area measured along a plane perpendicular to a longitudinal axis of the elongate resilient spacers, respectively.

36. The robotic end-effector of any preceding example, wherein at least some of the plurality of elongate resilient spacers are integrally formed with the exterior membrane.

37. The robotic end-effector of any preceding example, wherein at least some of the plurality of elongate resilient spacers are fixed to at least one of the exterior membrane or the inner portion of the finger using at least one of an adhesive or a bonding agent.

38. The robotic end-effector of any preceding example, wherein at least some of the plurality of elongate resilient spacers are fixed to at least one of the exterior membrane or the inner portion of the finger via a mechanical mounting device.

39. The robotic end-effector of any preceding example, wherein the plurality of elongate resilient spacers are integrally formed with a base substrate, and extend away from the base.

40. The robotic end-effector of any preceding example, further comprising a mounting bracket operable to mount the base and the elongate resilient spacers to the finger.

41. The robotic end-effector of any preceding example, further comprising a pressure source operatively coupled to the jamming conformal pad and operable to vary the pressure within the jamming conformal pad.

42. The robotic end-effector of any preceding example, wherein the pressure source is operable to provide a variable range of pressures within the jamming conformal pad to provide a variable degree of compliance to the jamming conformal pad between the compliant and stiff configurations.

43. The robotic end-effector of any preceding example, wherein the elongate resilient spacers each comprise a first end fixed to the inner portion of the at least one finger, and a second end comprising a free end.

44. The robotic end-effector of any preceding example, wherein the respective second ends of the elongate resilient spacers extend upward from the inner portion of the at least one finger toward the exterior membrane, and terminate at a distance away from the exterior membrane.

45. The robotic end-effector of any preceding example, wherein the respective second ends of the elongate resilient spacers extend upward from the inner portion of the at least one finger toward the exterior membrane, and terminate at the exterior membrane so as to be in contact with the exterior membrane.

46. The robotic end-effector of any preceding example, wherein the elongate resilient spacers apply a force to the exterior membrane to provide a pre-determined shape to the exterior membrane.

47. The robotic end effector of any preceding example, wherein at least some of the plurality of elongate resilient spacers have a uniform cross-section along a length of the elongate resilient spacers.

48. The robotic end effector of any preceding example, wherein the plurality of elongate resilient spacers define a matrix of elongate resilient spacers.

49. The robotic end effector of any preceding example, wherein at least some of the plurality of elongate resilient spacers are interconnected with one another.

50. The robotic end effector of any preceding example, wherein the elongate resilient spacers are configured to deform elastically to achieve the engaged shape upon engagement of the jamming conformal pad with the surface of the object, and wherein the elongate resilient spacers at least partially recover to an original, undeformed condition upon disengagement of the jamming conformal pad from the surface of the object.

51. The robotic end effector of any preceding example, wherein, in the stiff configuration, the jamming particles and the elongate resilient spacers form a stiff structural lattice.

52. A joint stiffening device configured to provide variable resistance, the device comprising:
a bladder coupled to a pair of movable members being movable with respect to one another about a joint; and
a filler within the bladder comprising jamming particles and elongate resilient spacers, wherein the jamming particles are flowable and the elongate resilient spacers are deformable in the bladder, wherein flow characteristics of the jamming particles about themselves and the elongate resilient spacers vary with pressure within the bladder, and wherein resistance to movement of the pair of movable members varies with the flow characteristics of the jamming particles about the elongate resilient spacers.

53. The device of any preceding example, further comprising a pressure source operatively coupled to the bladder and operable to vary the pressure within the bladder.

54. The device of any preceding example, wherein the pressure source is operable to provide a variable range of pressures within the bladder to provide a variable degree of resistance to movement of the pair of movable members about the joint.

55. The device of any preceding example, wherein the pressure source is capable of varying pressure within the bladder to provide resistance to movement of the pair of movable members between, and including, a zero resistance within the joint and a locked joint.

56. The device of any preceding example, wherein the bladder changes shape upon contact with the object; and wherein the jamming particles flow and move with respect to the elongate resilient spacers, and the elongate resilient spacers deform within the bladder, as the bladder changes shape.
57. The device of any preceding example, wherein the filler further comprises an interstitial material disposed in interstices between the jamming particles and the elongate resilient spacers.
58. The device of any preceding example, wherein the filler further comprises a fluid disposed in interstices between the jamming particles and the elongate resilient spacers.
59. The device of any preceding example, wherein at least some of the plurality of elongate resilient spacers comprise a non-uniform cross-section along a longitudinal axis of the elongate resilient spacers.
60. The device of any preceding example, wherein at least some of the plurality of elongate resilient spacers comprise opposing surfaces, each opposing surface having a surface area greater than a cross-sectional surface area measured along a plane perpendicular to a longitudinal axis of the elongate resilient spacers, respectively.
61. The device of any preceding example, wherein at least some of the plurality of elongate resilient spacers are integrally formed with the bladder.
62. The device of any preceding example, wherein at least some of the plurality of elongate resilient spacers are fixed to at least one of the bladder or the inner portion of the finger using at least one of an adhesive or a bonding agent.
63. The device of any preceding example, wherein at least some of the plurality of elongate resilient spacers are fixed to at least one of the bladder or the inner portion of the finger via a mechanical mounting device.
64. The device of any preceding example, wherein the plurality of elongate resilient spacers are integrally formed with a base substrate, and extend away from the base.
65. The device of any preceding example, further comprising a mounting bracket operable to mount the base and the elongate resilient spacers to the finger.
66. The device of any preceding example, further comprising a pressure source operatively coupled to the jamming conformal pad and operable to vary the pressure within the jamming conformal pad.
67. The device of any preceding example, wherein the pressure source is operable to provide a variable range of pressures within the jamming conformal pad to provide a variable degree of compliance to the jamming conformal pad between the compliant and stiff configurations.
68. The device of any preceding example, wherein the elongate resilient spacers each comprise a first end fixed to the inner portion of the at least one finger, and a second end comprising a free end.
69. The device of any preceding example, wherein the respective second ends of the elongate resilient spacers extend upward from the inner portion of the at least one finger toward a portion of the bladder, and terminate at a distance away from the bladder.
70. The device of any preceding example, wherein the respective second ends of the elongate resilient spacers extend upward from the inner portion of the at least one finger toward a portion of the bladder, and terminate at the bladder so as to be in contact with the bladder.
71. The device of any preceding example, wherein the elongate resilient spacers apply a force to the bladder to provide a pre-determined shape to the bladder.
72. The device of any preceding example, wherein at least some of the plurality of elongate resilient spacers have a uniform cross-section along a length of the elongate resilient spacers.
73. The device of any preceding example, wherein the plurality of elongate resilient spacers define a matrix of elongate resilient spacers.
74. The device of any preceding example, wherein at least some of the plurality of elongate resilient spacers are interconnected with one another.
75. The device of any preceding example, wherein the elongate resilient spacers are configured to deform elastically to achieve the engaged shape upon engagement of the jamming conformal pad with the surface of the object, and wherein the elongate resilient spacers at least partially recover to an original, undeformed condition upon disengagement of the jamming conformal pad from the surface of the object.
76. The device of any preceding example, wherein, in the stiff configuration, the jamming particles and the elongate resilient spacers form a stiff structural lattice.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A robotic end-effector configured to provide conformal object interaction, comprising:
   one or more fingers, each having an inner portion and each operable in one or more degrees of freedom; and
   one or more jamming conformal pads, each pad disposed on the inner portion of a corresponding finger of the one or more fingers, each jamming conformal pad comprising:
      an exterior membrane conformable to a surface of an object, and
      a filler disposed between the membrane and the inner portion of the at least one finger, the filler comprising a plurality of elongate resilient spacers and a plurality of jamming particles.

2. The robotic end-effector of claim 1, wherein each of the one or more jamming conformal pads is operable in at least one of two pad configurations, the at least two pad configurations comprising:
   a compliant configuration in which a shape of the jamming conformal pad is changeable to achieve an engaged shape upon engagement of the pad with the surface of the object; and
   a stiff configuration in which the jamming conformal pad maintains the engaged shape, and is relatively stiff compared to the jamming conformal pad in the compliant configuration.

3. The robotic end-effector of claim 1, wherein the elongate resilient spacers each comprise a first end fixed to the inner portion of the at least one finger, and a second end comprising a free end.

4. The robotic end-effector of claim 3, wherein the respective second ends of the elongate resilient spacers extend upward from the inner portion of the at least one finger toward the exterior membrane, and terminate at a distance away from the exterior membrane.

5. The robotic end-effector of claim 3, wherein the respective second ends of the elongate resilient spacers extend upward from the inner portion of the at least one finger toward the exterior membrane, and terminate at the exterior membrane so as to be in contact with the exterior membrane.

6. The robotic end-effector of claim 5, wherein the elongate resilient spacers apply a force to the exterior membrane to provide a pre-determined shape to the exterior membrane.

7. The robotic end effector of claim 1, wherein at least some of the plurality of elongate resilient spacers have a uniform cross-section along a length of the elongate resilient spacers.

8. The robotic end effector of claim 1, wherein the plurality of elongate resilient spacers define a matrix of elongate resilient spacers.

9. The robotic end effector of claim 8, wherein at least some of the plurality of elongate resilient spacers are interconnected with one another.

10. The robotic end effector of claim 1, wherein the elongate resilient spacers are configured to deform elastically to achieve the engaged shape upon engagement of the jamming conformal pad with the surface of the object, and wherein the elongate resilient spacers at least partially recover to an original, undeformed condition upon disengagement of the jamming conformal pad from the surface of the object.

11. The robotic end effector of claim 1, wherein, in the stiff configuration, the jamming particles and the elongate resilient spacers form a stiff structural lattice.

12. The robotic end-effector of claim 1, wherein the jamming conformal pad is operable to distribute across the surface of the object and at least partially infiltrate into any indentations in the surface, defining a conformal engaging surface configured to match and mate with the surface of the object, and wherein the one or more jamming conformal pads comprises an active area capable of changing compliant characteristics to alternately change and maintain a contour of the conformal engaging surface.

13. The robotic end-effector of claim 12, wherein the conformal engaging surface is an active surface capable of alternately changing and maintaining a contour.

14. The robotic end-effector of claim 12, wherein the filler has at least two configurations, the configurations comprising:
   a flowable configuration, corresponding to the compliant configuration of the jamming conformal pad, in which the jamming particles of the filler flow and the elongate resilient spacers deform as the exterior membrane conforms to the surface; and
   a static configuration, corresponding to the stiff configuration of the jamming conformal pad, in which the jamming particles are lodged between the elongate resilient spacers of the filler, and in which the jamming particles and the elongate resilient spacers are static as compared to flowable configuration.

15. The robotic end-effector of claim 1, wherein the jamming conformal pad is binary, and operable only in the compliant and stiff configurations.

16. The robotic end-effector of claim 1, wherein the jamming conformal pad is analog, and is operable in multiple varying degrees of stiffness between the compliant and stiff configurations.

17. The robotic end-effector of claim 1, wherein the jamming conformal pad further comprises:
   a bladder defined by the exterior membrane, the bladder being supported on the inner portion of the at least one finger,
   wherein flow characteristics of the jamming particles interacting with the plurality of elongate resilient spacers of the filler vary with pressure within the bladder, and compliance of the bladder varies with the flow characteristics of the jamming particles and the elongate resilient spacers.

18. The robotic end-effector of claim 17, wherein the bladder changes shape upon contact with the object; and wherein the jamming particles flow and move with respect to the elongate resilient spacers, and the elongate resilient spacers deform within the bladder, as the bladder changes shape.

19. The robotic end-effector of claim 1, wherein the filler further comprises an interstitial material disposed in interstices between the jamming particles and the elongate resilient spacers.

20. The robotic end-effector of claim 1, wherein the filler further comprises a fluid disposed in interstices between the jamming particles and the elongate resilient spacers.

21. The robotic end-effector of claim 1, wherein at least some of the plurality of elongate resilient spacers comprise a non-uniform cross-section along a longitudinal axis of the elongate resilient spacers.

22. The robotic end-effector of claim 1, wherein at least some of the plurality of elongate resilient spacers comprise opposing surfaces, each opposing surface having a surface area greater than a cross-sectional surface area measured along a plane perpendicular to a longitudinal axis of the elongate resilient spacers, respectively.

23. The robotic end-effector of claim 1, wherein at least some of the plurality of elongate resilient spacers are integrally formed with the exterior membrane.

24. The robotic end-effector of claim 1, wherein at least some of the plurality of elongate resilient spacers are fixed to at least one of the exterior membrane or the inner portion of the finger using at least one of an adhesive or a bonding agent.

25. The robotic end-effector of claim 1, wherein at least some of the plurality of elongate resilient spacers are fixed to at least one of the exterior membrane or the inner portion of the finger via a mechanical mounting device.

26. The robotic end-effector of claim 1, wherein the plurality of elongate resilient spacers are integrally formed with a base substrate, and extend away from the base.

27. The robotic end-effector of claim 1, further comprising a mounting bracket operable to mount the base and the elongate resilient spacers to the finger.

28. The robotic end-effector of claim 1, further comprising a pressure source operatively coupled to the jamming conformal pad and operable to vary the pressure within the jamming conformal pad.

29. The robotic end-effector of claim 1, wherein the pressure source is operable to provide a variable range of pressures within the jamming conformal pad to provide a variable degree of compliance to the jamming conformal pad between the compliant and stiff configurations.

30. A robotic end-effector, comprising:
a pair of members being movable with respect to one another;
a bladder on at least one of the members; and
a filler within the bladder comprising a plurality of jamming particles and a plurality of elongate resilient spacers, wherein each of the plurality of jamming particles is operable to flow within the bladder, wherein flow characteristics of the plurality of jamming particles about themselves and the plurality of elongate resilient spacers vary with pressure within the bladder, and wherein compliance of the bladder varies with the flow characteristics of the jamming particles;
wherein the bladder with the filler therein has at least two configurations, comprising:
a compliant configuration in which a shape of the bladder and filler are changeable; and
a stiff configuration in which change in the shape of the bladder and filler is resisted, and in which the bladder and filler are stiff as compared to the bladder and filler in the compliant configuration.

31. A joint stiffening element device configured to provide variable resistance, the device comprising:
a bladder coupled to a pair of movable members being movable with respect to one another about a joint; and
a filler within the bladder comprising jamming particles and elongate resilient spacers, wherein the jamming particles are flowable and the elongate resilient spacers are deformable in the bladder, wherein flow characteristics of the jamming particles about themselves and the elongate resilient spacers vary with pressure within the bladder, and wherein resistance to movement of the pair of movable members varies with the flow characteristics of the jamming particles about the elongate resilient spacers.

32. The device of claim 31, further comprising a pressure source operatively coupled to the bladder and operable to vary the pressure within the bladder.

33. The device of claim 32, wherein the pressure source is operable to provide a variable range of pressures within the bladder to provide a variable degree of resistance to movement of the pair of movable members about the joint.

34. The device of claim 32, wherein the pressure source is capable of varying pressure within the bladder to provide resistance to movement of the pair of movable members between, and including, a zero resistance within the joint and a locked joint.

\* \* \* \* \*